(12) United States Patent
Fritze

(10) Patent No.: US 7,067,054 B2
(45) Date of Patent: Jun. 27, 2006

(54) WATER FILTER ASSEMBLY FOR USE IN AN APPLIANCE

(75) Inventor: Karl Fritze, Denmark Township, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 103 days.

(21) Appl. No.: 10/210,890

(22) Filed: Jul. 31, 2002

(65) Prior Publication Data

US 2003/0024860 A1   Feb. 6, 2003

Related U.S. Application Data

(60) Provisional application No. 60/309,127, filed on Jul. 31, 2001.

(51) Int. Cl.
*B01D 25/30* (2006.01)

(52) U.S. Cl. ............ 210/85; 210/87; 210/97; 210/235; 210/175; 210/323.1; 222/189.06; 222/36; 62/339

(58) Field of Classification Search ............ 210/85, 210/87, 97, 282, 232, 234, 235, 175, 323.1; 222/23, 189.06, 189.11, 36; 62/339; 73/861.78
See application file for complete search history.

(56) References Cited

U.S. PATENT DOCUMENTS

| | | |
|---|---|---|
| 3,399,776 A | 9/1968 | Knuth |
| 3,746,171 A | 7/1973 | Thomsen |
| 4,559,136 A | 12/1985 | Dockery |
| 4,786,420 A | 11/1988 | Dalessandro |
| 4,857,191 A | 8/1989 | Wolf |
| 4,915,831 A | 4/1990 | Taylor |
| 5,022,986 A | 6/1991 | Lang |
| 5,135,645 A | 8/1992 | Sklenak |
| 5,256,285 A | 10/1993 | Tomita |
| 5,320,752 A | 6/1994 | Clack et al. |
| 5,336,406 A | 8/1994 | Stanford et al. |
| 5,397,462 A | 3/1995 | Higashijima |
| 5,435,909 A * | 7/1995 | Burrows ............ 210/85 |
| 5,540,107 A | 7/1996 | Silverman et al. |
| 5,622,618 A | 4/1997 | Brane et al. |
| 5,753,107 A | 5/1998 | Magnusson et al. |
| 5,766,487 A | 6/1998 | Park |
| 6,051,144 A | 4/2000 | Clack et al. |
| 6,120,685 A | 9/2000 | Carlson et al. |

(Continued)

FOREIGN PATENT DOCUMENTS

EP    0318832    6/1989

(Continued)

OTHER PUBLICATIONS

International Search Report (PCT/US02/24281) dated Jan. 3, 2003.

*Primary Examiner*—Terry K. Cecil

(57) ABSTRACT

An apparatus for filtering water dispensed from an appliance (e.g. a refrigerator) includes a low-profile filter cartridge (or a bank of filter cartridges) releasably connected to a manifold assembly. The manifold assembly is in communication with the water inlet of appliance and routs the filtered water to points of use. A water usage sensor in the manifold monitors the filter cartridge life and alerts the user when it is time to replace the filter. A latching mechanism includes a latching member 200 on the cartridge and a linearly moveable actuator 174 for releaseably securing the filter cartridge to the manifold assembly. A flow control valve ensures that the water circuit remains closed when the filter cartridge is removed from the manifold.

21 Claims, 25 Drawing Sheets

U.S. PATENT DOCUMENTS

RE37,216 E      6/2001   Koslow
6,303,031 B1   10/2001   Senner
6,337,015 B1 *  1/2002   Poirier .................... 210/232
6,355,177 B1 *  3/2002   Senner et al. ............. 210/739
6,843,912 B1 *  1/2005   Chaney et al. ............. 210/234

FOREIGN PATENT DOCUMENTS

GB         1566502       4/1980
WO     WO 01/17654      3/2001

* cited by examiner

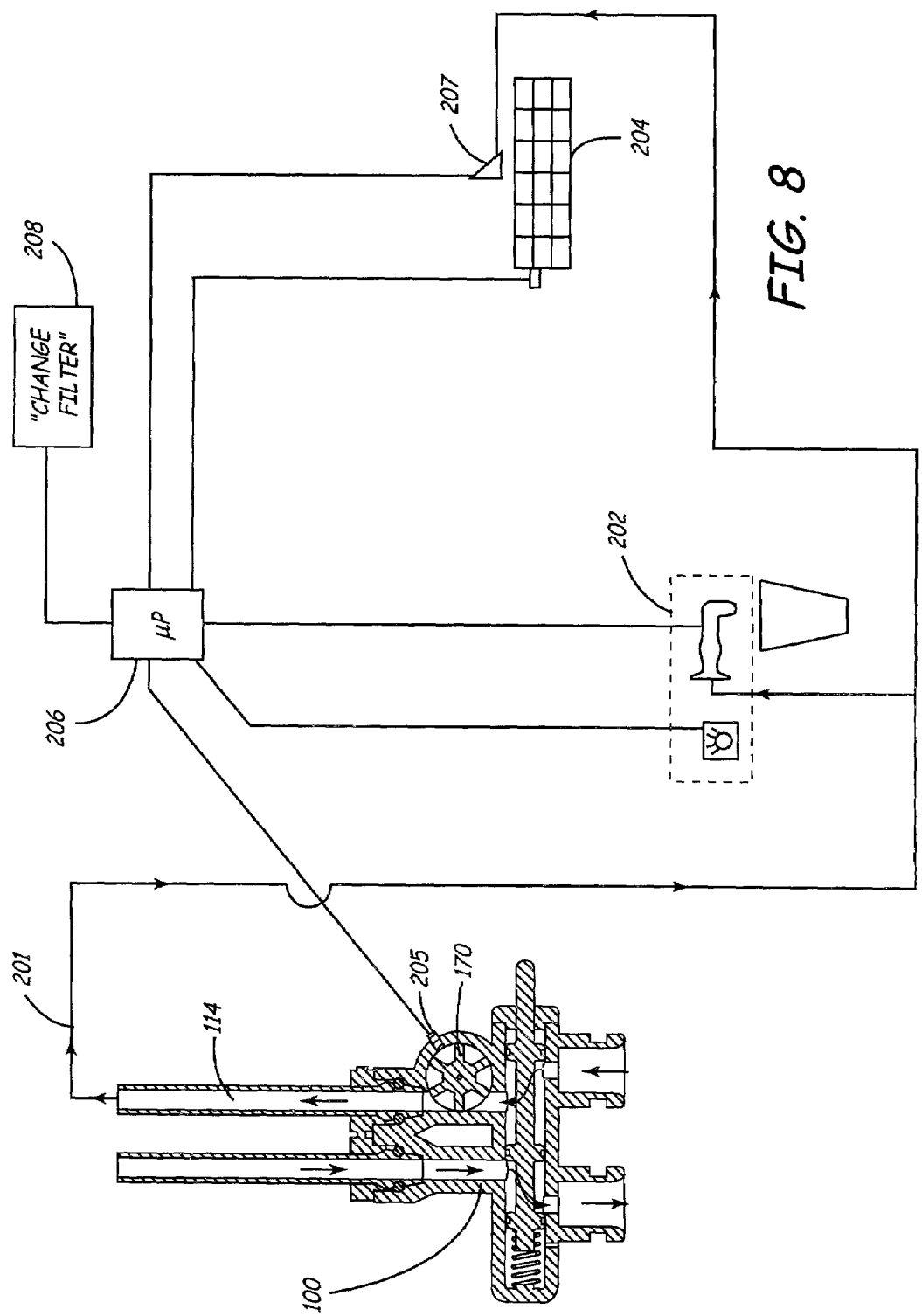

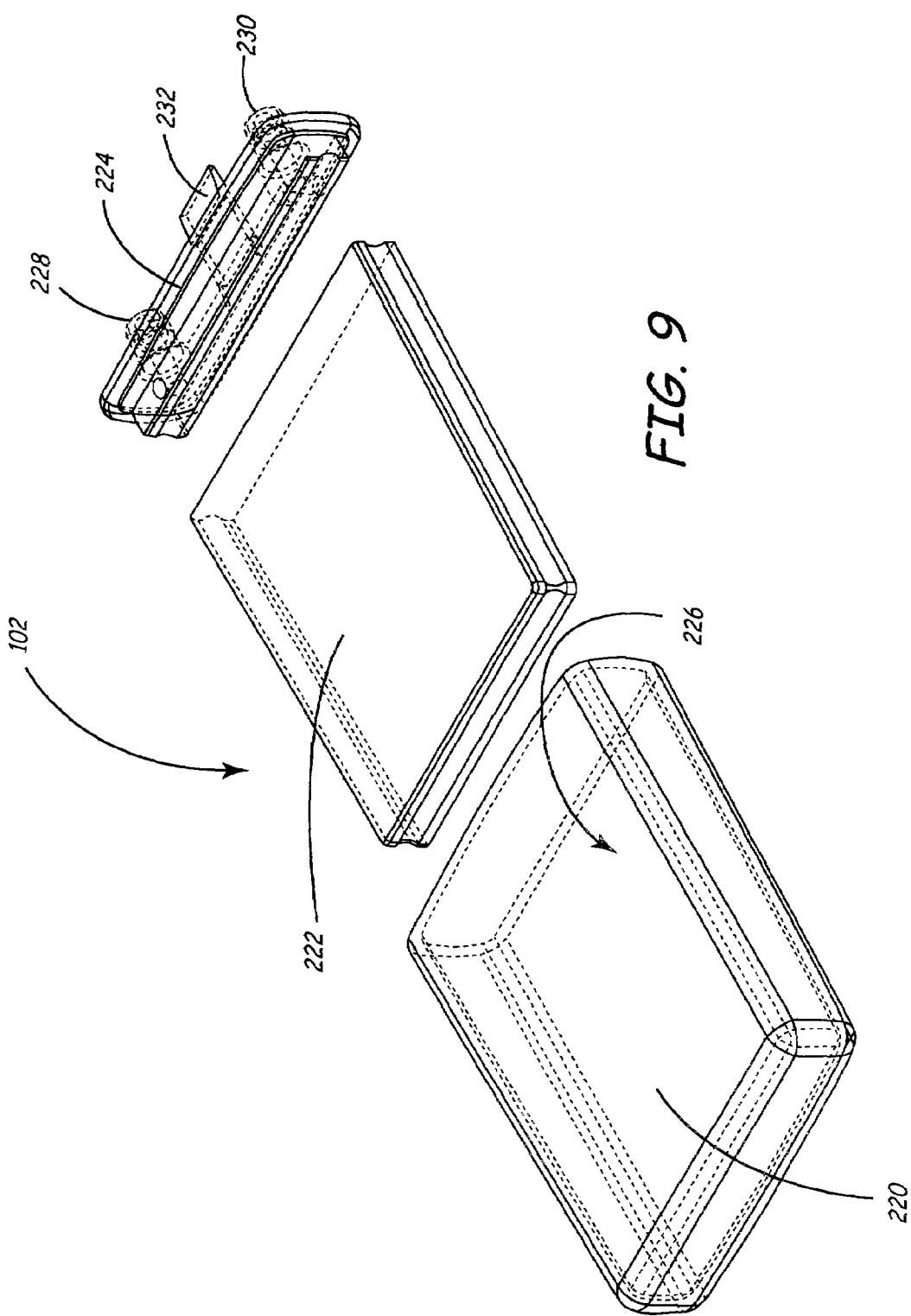

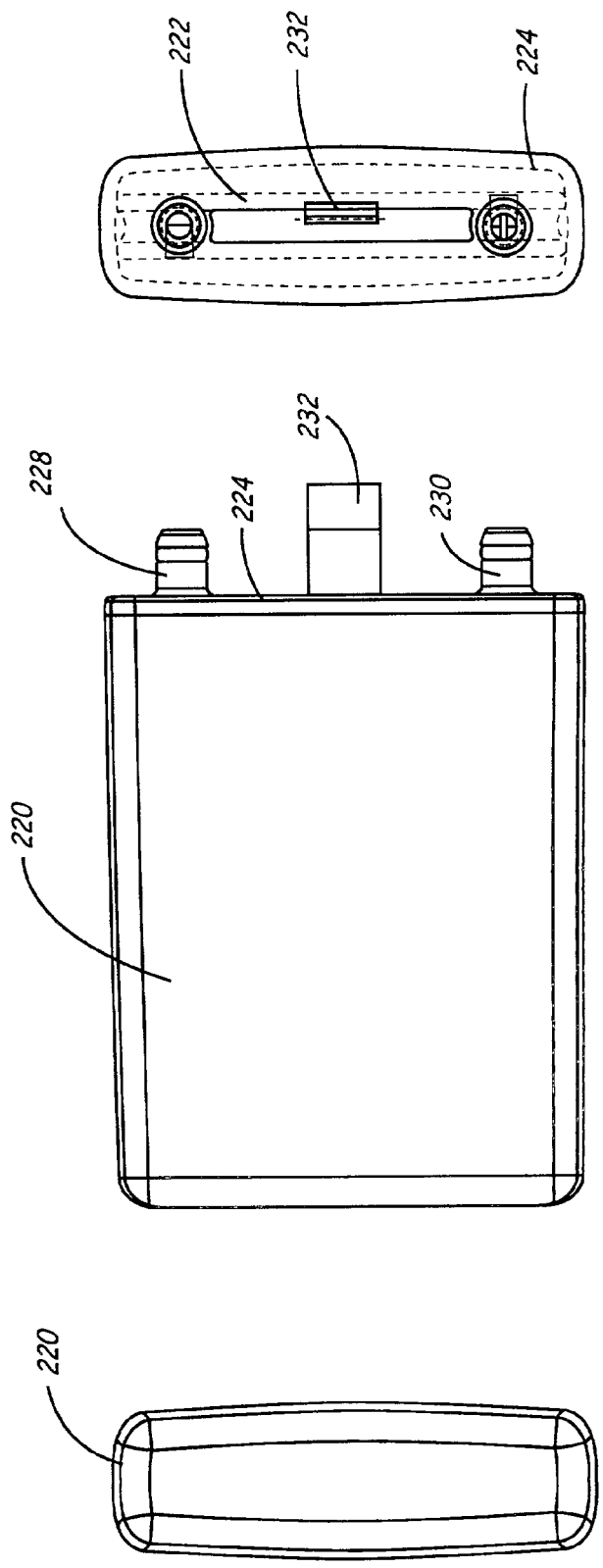

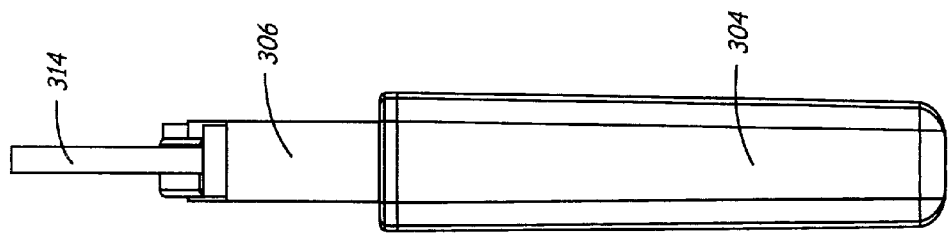
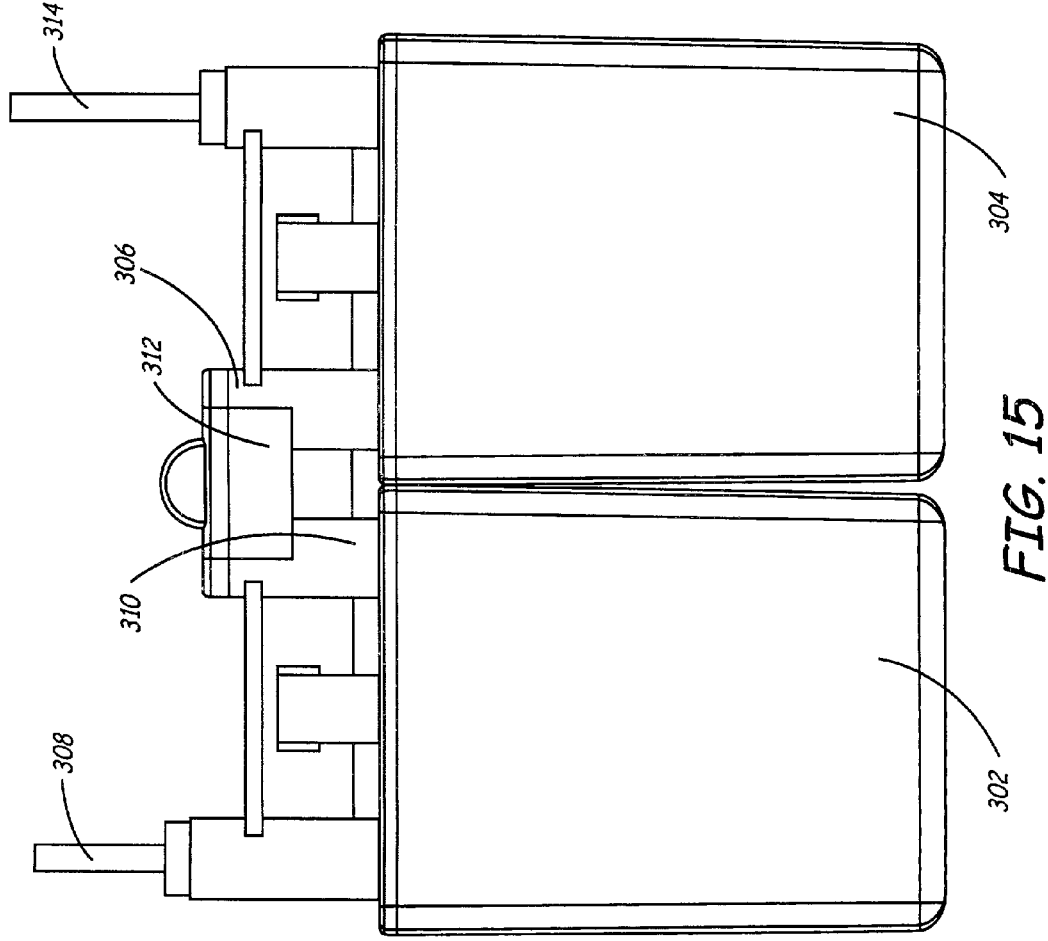

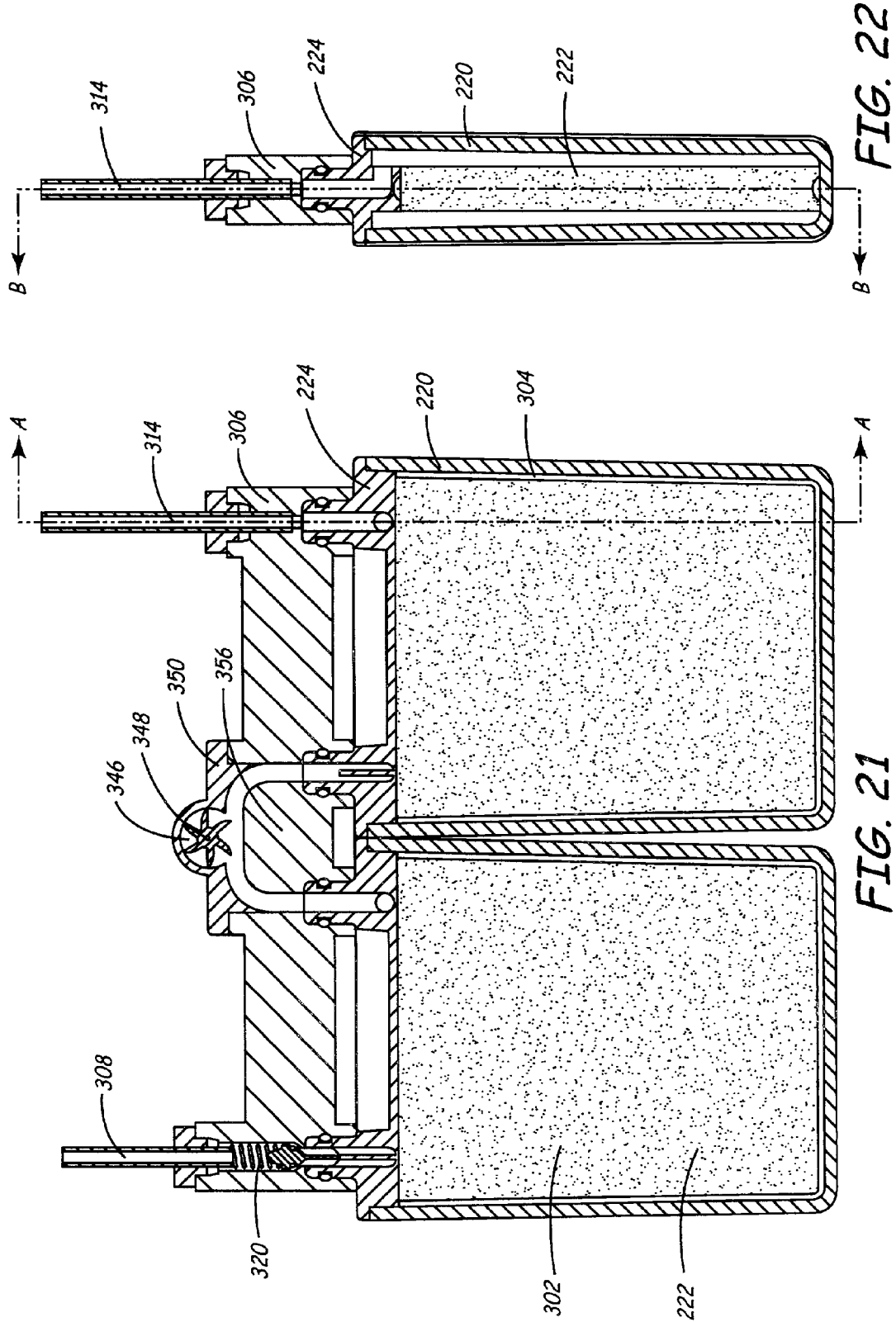

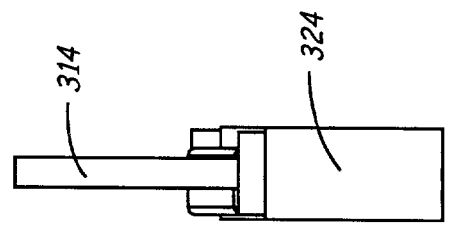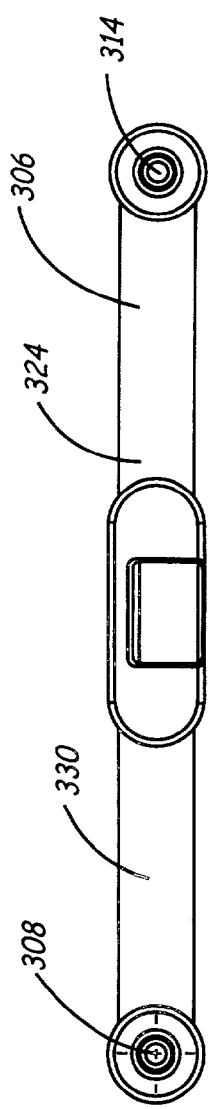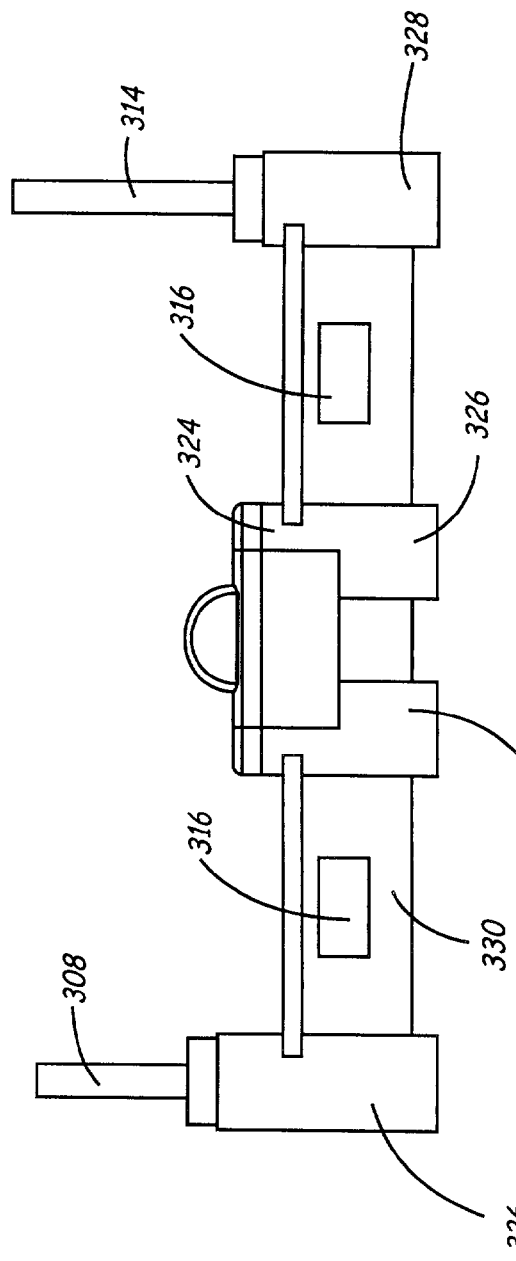

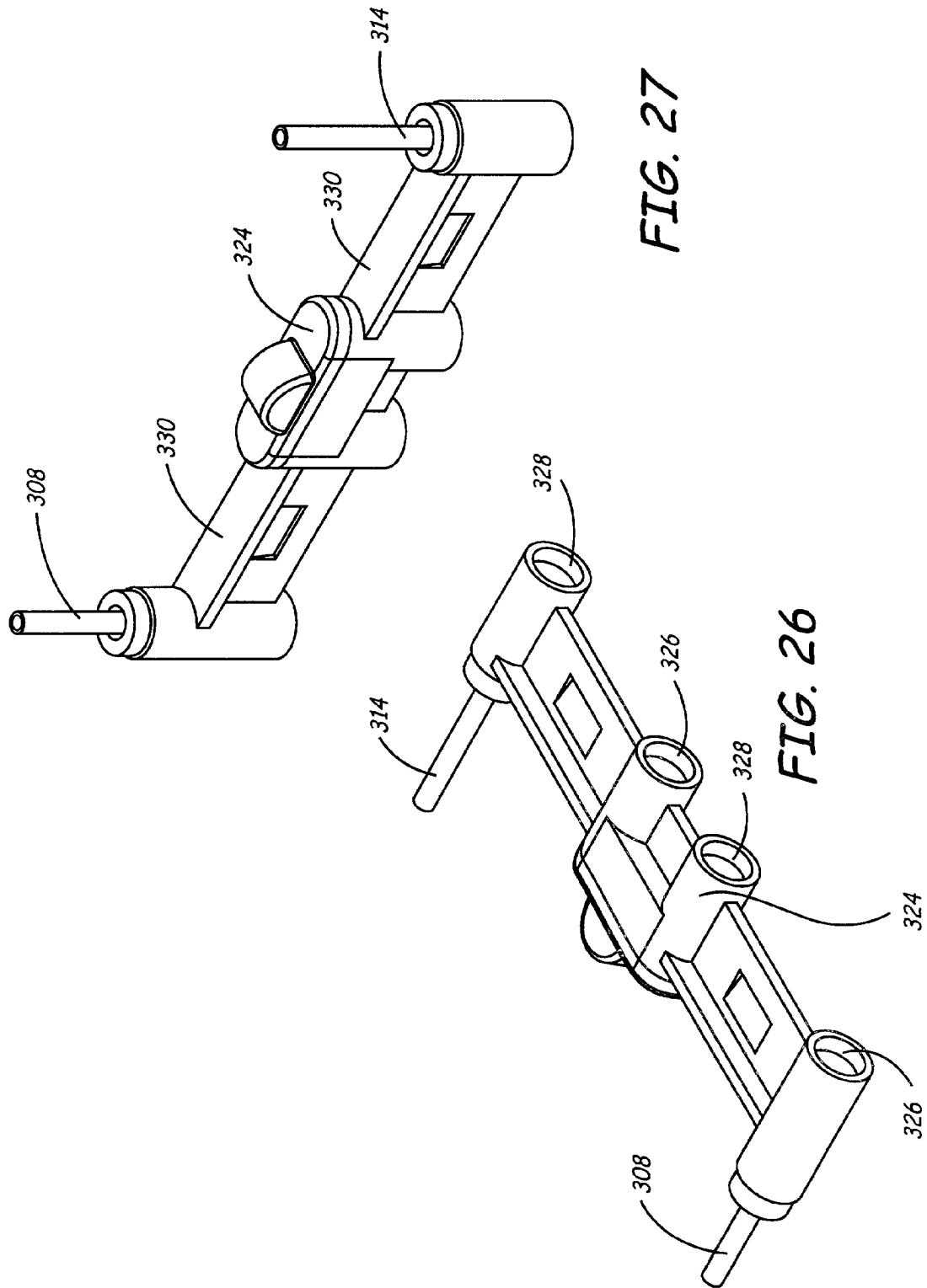

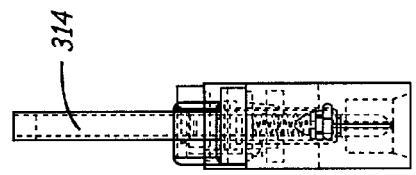
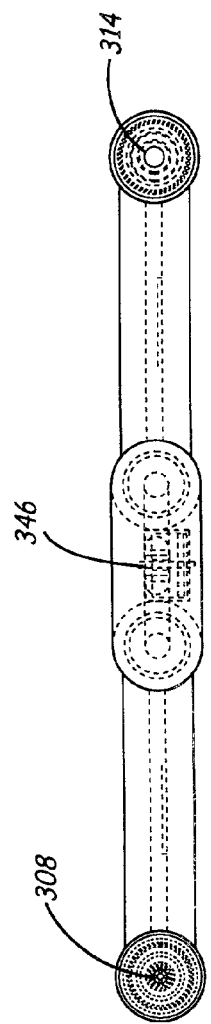
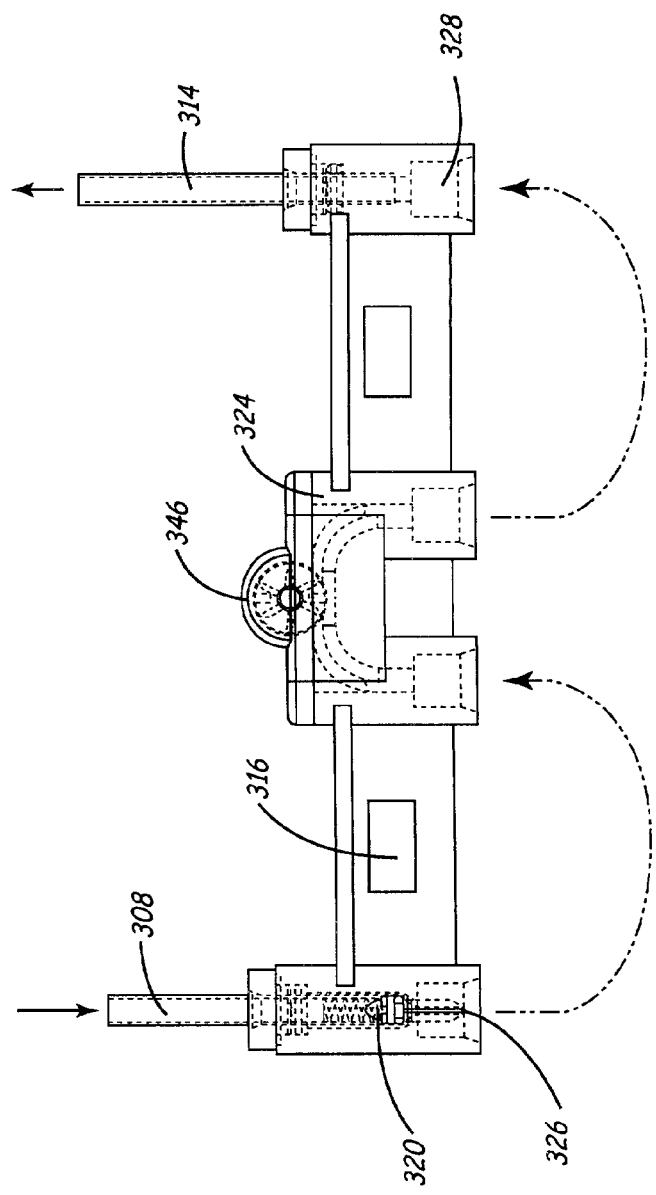

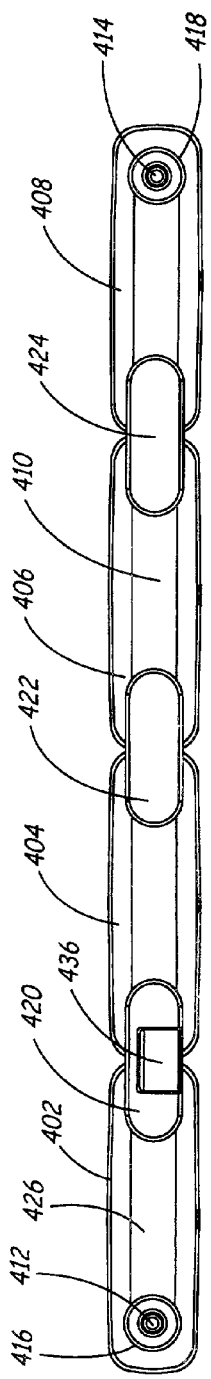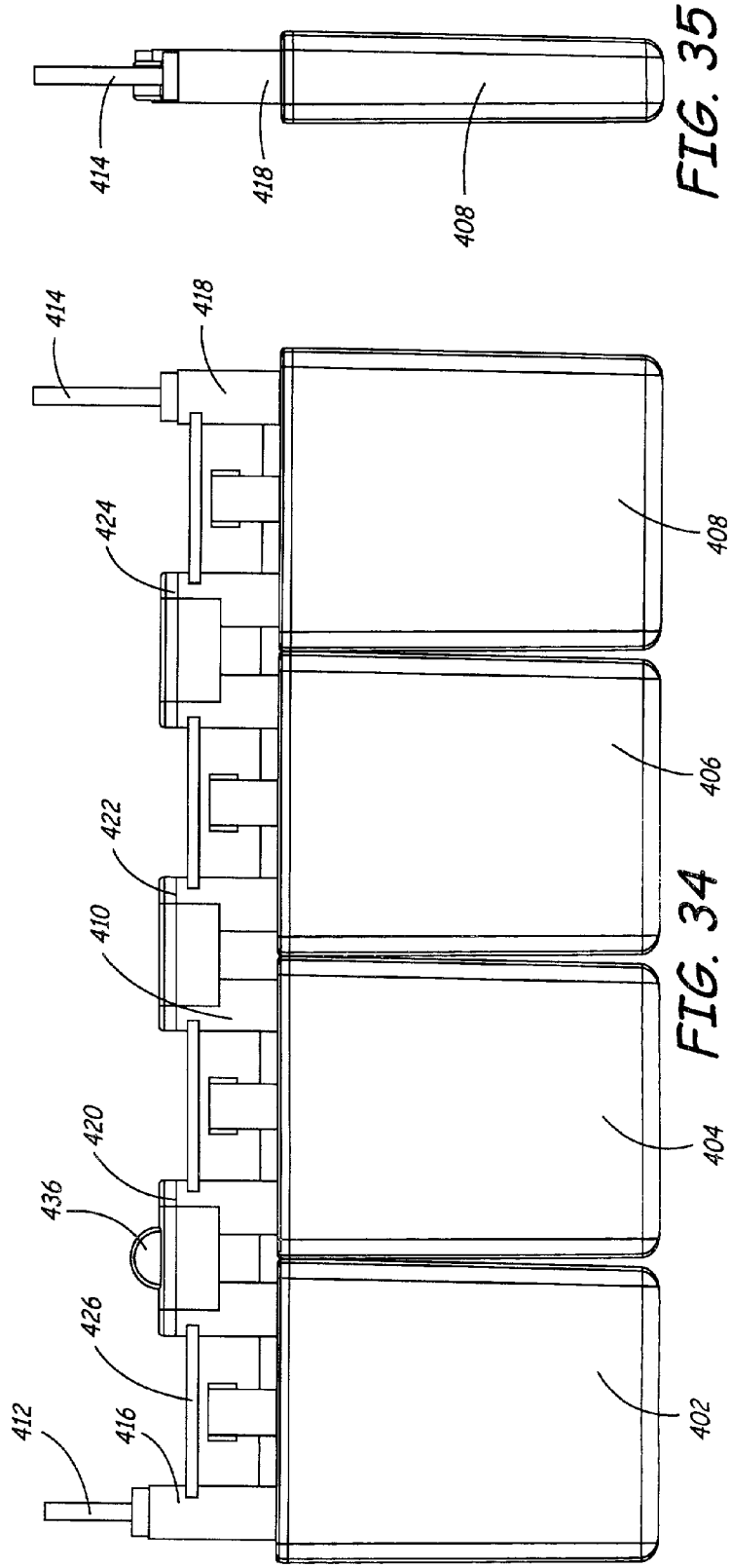

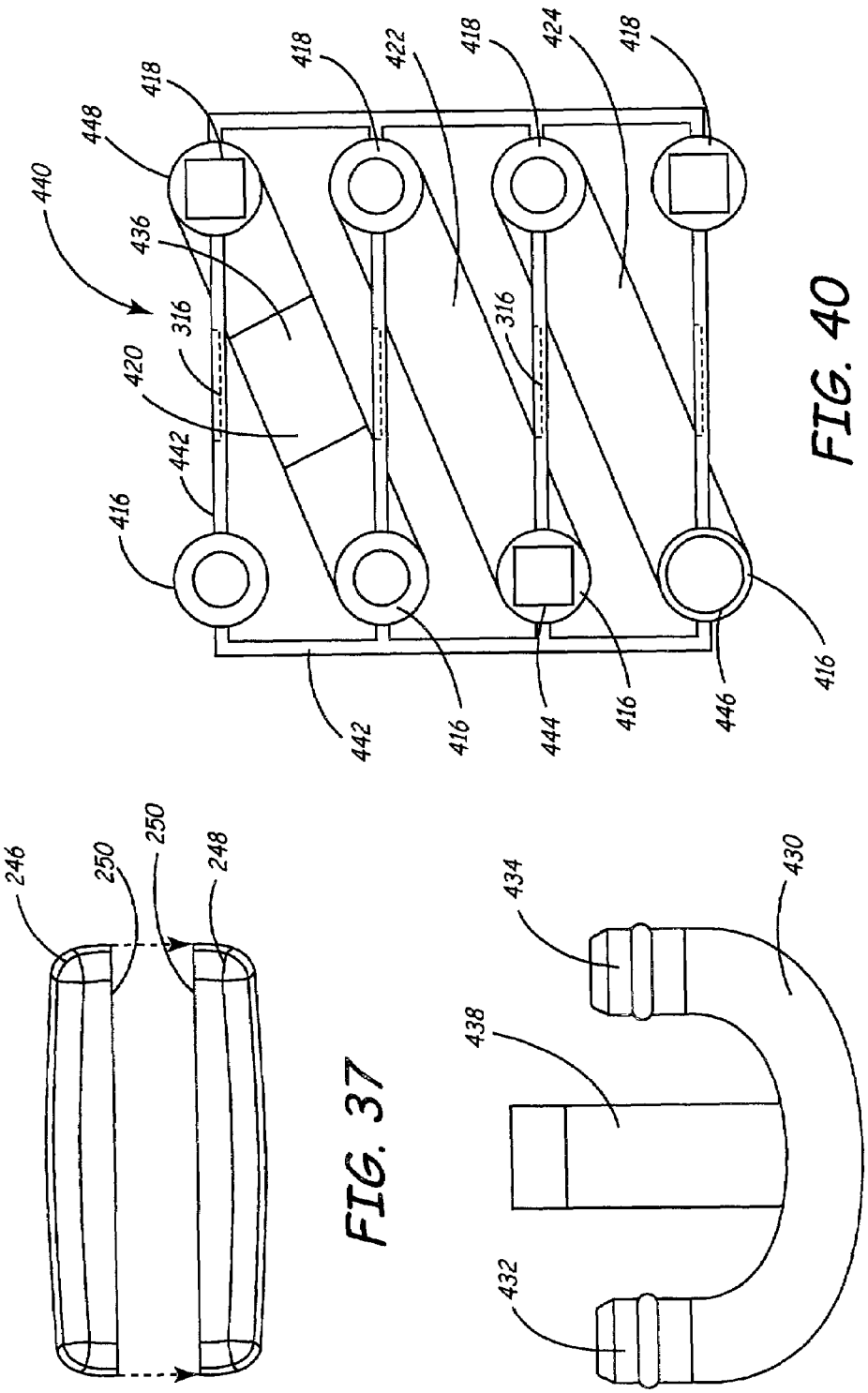

WATER FILTER ASSEMBLY FOR USE IN AN APPLIANCE

RELATED APPLICATION

The present application claims the benefit of U.S. Provisional Application No. 60/309,127 filed Jul. 31, 2001, which is incorporated herein in its entirety by reference.

FIELD OF THE INVENTION

The present invention relates generally to the field of residential and commercial water filtration products. More specifically, the present invention relates to a replaceable water filtration assembly for use in water dispensing appliances.

BACKGROUND OF THE INVENTION

Residential and commercial consumers have become increasingly concerned with the quality of water they use every day. Whether their water comes from municipal sources or a well, these consumers increasingly rely on point-of-use filtration systems to insure that the water they consume has the taste and appearance they desire. Because these systems continue to gain popularity, it has become increasingly important that system maintenance be quick and easy to accomplish.

An unfortunate drawback of point-of-use systems is that they must be small enough to fit into the limited space available in the residential and commercial markets. As overall size and a system's filtering capacity are directly related, point-of-use systems require more frequent filter media replacement than their industrial and municipal counterparts. As many consumers will have little to no experience with water filter systems, it would be desirable for a system to be capable of providing notice when maintenance is required and for this maintenance to be performed quickly and easily.

SUMMARY OF THE INVENTION

The present invention addresses the disadvantages of the prior art by providing a low profile modular filtering assembly for use in water dispensing appliances. The method and apparatus for filtering water dispensed by a water dispensing appliance comprises a low-profile filter cartridge releasably connected to a manifold assembly. The manifold assembly is in communication with the wafer inlet to the appliance and routes the filtered water to points of use in the appliance. The manifold assembly includes water usage sensor to monitor filter cartridge life and relay that information to the appliance, which will then alert the user when it is necessary to replace the filter. A latching mechanism is included to releasably secure the filter cartridge to the manifold assembly. A flow control valve ensures that the water circuit remains closed when the filter cartridge is removed from the manifold assembly. The cartridge and manifold assembly include registration features to ensure that reverse installation of the cartridge will not occur.

BRIEF DESCRIPTION OF THE DRAWINGS

FIG. 8 is a water flow and control schematic for an intelligent appliance employing a modular water filter assembly according to an embodiment of the present invention;

FIG. 9 is an assembly diagram for a filter cartridge according to an embodiment of the present invention;

FIG. 10 is a front view of a filter cartridge according to an embodiment of the present invention;

FIG. 11 is a top plan view of a filter cartridge according to an embodiment of the present invention;

FIG. 12 is a rear view of a filter cartridge according to an embodiment of the present invention;

FIG. 15 is a plan view of a modular filter assembly according to an embodiment of the present invention;

FIG. 16 is a side view of a modular filter assembly according to an embodiment of the present invention;

FIG. 21 is a horizontal cross sectional view of a modular filter assembly according to an embodiment of the present invention;

FIG. 22 is a vertical cross sectional view of a modular filter assembly according to an embodiment of the present invention;

FIG. 23 is a side view of a manifold assembly for a modular filter assembly according to an embodiment of the present invention;

FIG. 24 is a plan view of a manifold assembly for a modular filter assembly according to an embodiment of the present invention;

FIG. 25 is a front view of a manifold assembly for a modular filter assembly according to an embodiment of the present invention;

FIG. 26 is a perspective view of a manifold assembly for a modular filter assembly according to an embodiment of the present invention;

FIG. 27 is a perspective view of a manifold assembly for a modular filter assembly according to an embodiment of the present invention;

FIG. 28 is a side view of the manifold assembly depicted in FIG. 23 showing hidden detail according to an embodiment of the present invention;

FIG. 29 is a plan view of the manifold assembly depicted in FIG. 24 showing hidden detail according to an embodiment of the present invention;

FIG. 30 is a front view of the manifold assembly depicted in FIG. 25 showing hidden detail according to an embodiment of the present invention;

FIG. 33 is a top view of a modular filter assembly according to an embodiment of the present invention;

FIG. 34 is a plan view of a modular filter assembly according to an embodiment of the present invention;

FIG. 35 is a side view of a modular filter assembly according to an embodiment of the present invention;

FIG. 36 is a plan view of a filter cartridge blank according to an embodiment of the present invention;

FIG. 37 is a front view of the upper portion and lower portions of the filter cartridge shell aligned for a joining operation according to an embodiment of the present invention;

FIG. 40 is a front view of a manifold assembly for a modular filter assembly according to an embodiment of the present invention;

DETAILED DESCRIPTION OF THE DRAWINGS

The filter assemblies 100 described herein may be used with a wide variety of appliances that use or dispense water, such as refrigerators, bottle-less water coolers and water filtration systems. The exemplary descriptions of the preferred embodiment herein will be made with respect to use in a refrigerator and are not intended to preclude the use of the present invention in other appliances or applications.

Figure 1:
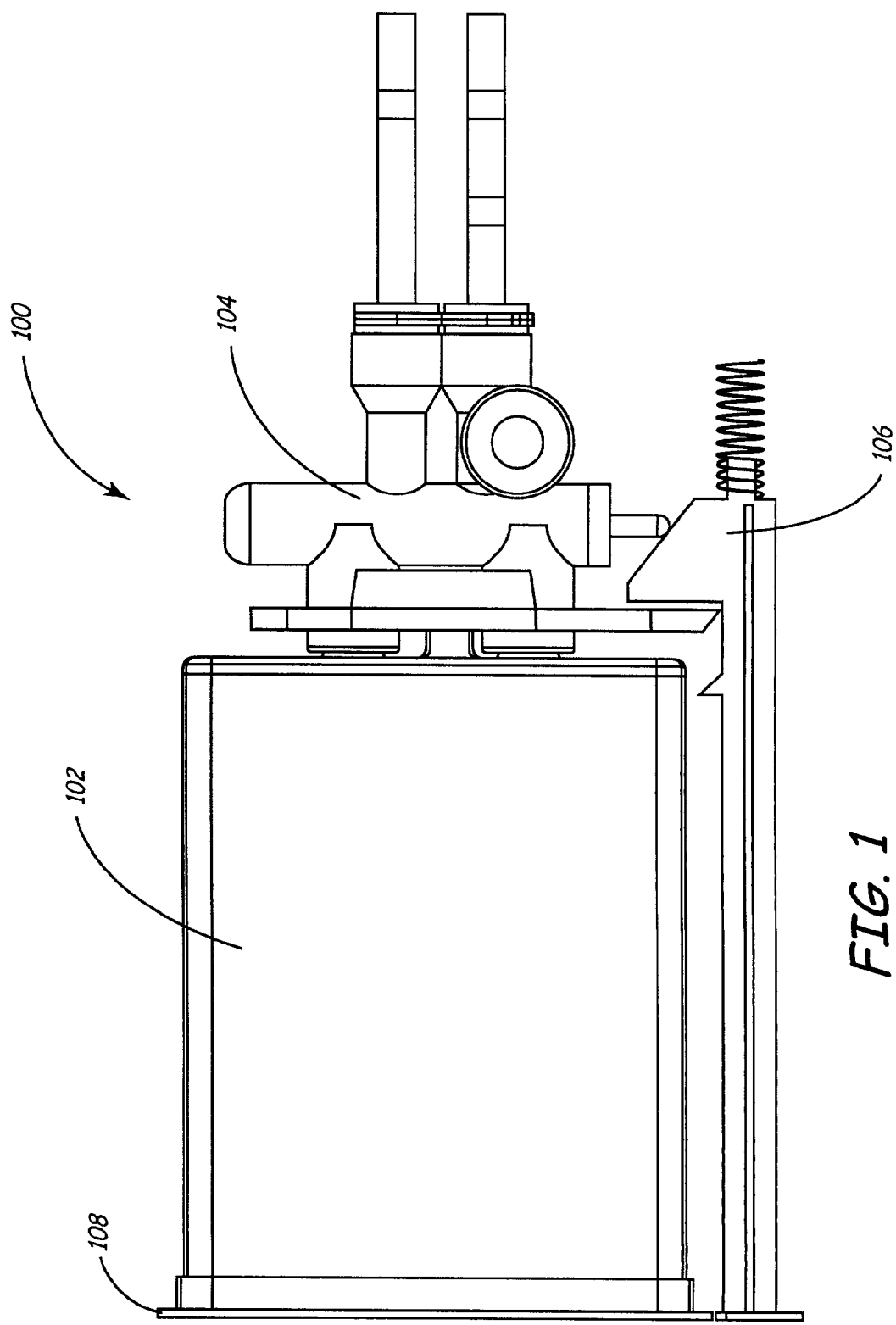
FIG. 1 is a plan view of a modular filter assembly according to an embodiment of the present invention.

Referring to FIG. 1, a modular water filter assembly 100 according to an embodiment of the present invention is shown. The filter assembly 100 generally comprises a filter cartridge 102, a manifold assembly 104 and a latching assembly 106. The filter cartridge 102 may also receive an optional end cap 108 in order to place written information visible to the user and/or to enhance the visual appeal of the filter cartridge 102 within an appliance.

Figure 2:
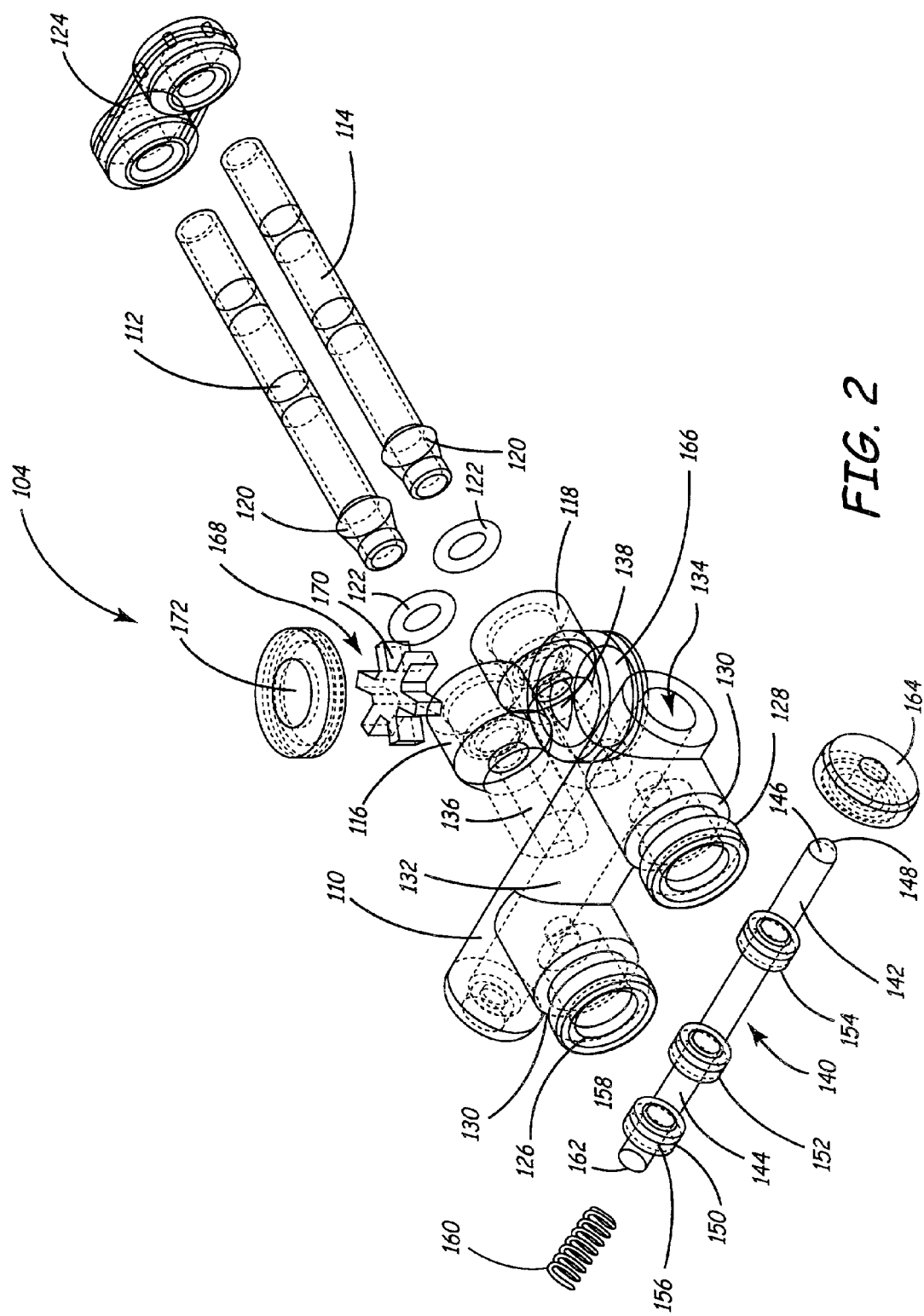
FIG. 2 is an exploded view of a manifold assembly for a modular filter assembly according to an embodiment of the present invention.

Referring to FIG. 2, an exploded view of the manifold assembly 104 is shown according to an embodiment of the present invention. The manifold assembly 104 generally comprises a manifold block 110, an inlet conduit 112 and an outlet conduit 114. The inlet conduit 112 carries unfiltered water to the manifold block 110 and the outlet conduit 114 carries filtered water away from the manifold block 110. The manifold assembly includes respective inlet 116 and outlet 118 receptacles for receiving the conduits 112, 114. A male end 120 of each conduit 112, 114 is provided with a sealing gasket 122, such as a rubber O-ring, and is then inserted into a respective receptacle portion 116, 118. A manifold fastener 124 is then tightened onto the receptacles 116, 118 by threaded attachment or gluing. The conduits 112, 114 protrude through the manifold fastener 124, which cooperates with the enlarged male end 120 of the conduits 112, 114 to maintain the fluid tight seal with the manifold block 110.

The manifold block 110 also defines a respective inlet port 126 and outlet port 128 portions for receiving the filter cartridge 102. Each port portion 126, 128 includes a groove or channel 130 therearound, which will be discussed further hereinbelow.

An internal fluid passageway 132 is defined within the manifold block 110 for passing water therethrough. A portion of this fluid passageway is referred to as the transverse channel 134. The transverse channel 134 interconnects the inlet 136 and outlet 138 fluid passages. A flow diversion device 140 is placed within the transverse channel 134 to selectively control the water flow in the manifold block 110. The flow diversion device 140, also known as a spool valve, comprises an elongated member 142 having longitudinal surface 144 and a cam surface 146 on a first end 148. Diverter seals 150, 152, 154 are disposed about the longitudinal surface 144. Each of the diverter seals 150, 152, 154 is annular in shape and defines a groove 156 therearound for receiving a sealing gasket 158, such as a rubber O-ring.

A biasing device 160, such as a spring, is placed in the transverse channel 134 in contact with a second end 162 of the flow diversion device 140. A cap 164 is fastened on an open end of the manifold block 110 at the transverse channel 134. The first end 148 of the flow diversion device protrudes slightly from the cap 164.

The manifold block 110 optionally includes a flowmeter housing portion 166 in communication with the flow of filtered water arriving from the filter cartridge 102. Those having skill in the art will also recognize that the flow meter housing 166 may also be placed in communication with the inlet flow of water without departing from the scope of the present invention. A flowmeter assembly 168 is disposable within the flowmeter housing 166. The flowmeter assembly 168, according to a preferred embodiment, is an impeller wheel 170 that rotates in relation to the water flowing through the outlet conduit 114. A cap 172 is used to seal the impeller 170 within the flowmeter housing 166.

A hall effect sensor can be placed in proximity to the flow meter housing 166 to sense the rotation of the impeller wheel 170. The impeller 170 contains a magnet that the hall effect sensor can use to determine one or more of the number and speed of the revolutions of the impeller wheel. The impeller shown in FIG. 2 is a radial flow design. An axial flow impeller wheel may be used alternatively within the scope of the present invention. An additional alternative embodiment may use an optical sensor to count the revolutions of the impeller wheel.

An "intelligent" appliance can use the flow information from the flowmeter 168 to monitor the volume of water filtered by a given cartridge 102. The appliance can then indicate that the filter cartridge 102 needs to be replaced based upon usage. Usage-based replacement is advantageous over time-elapse replacement because a heavy water user may not be receiving adequately filtered water by the time the filter is replaced. Therefore, the heavy user may be exposed to contaminants that were thought to be filtered out. A light water user may replace a filter before its filtering properties degrade to the point of necessary replacement. This causes the light water user to needlessly spend money and generate waste.

Figure 3:
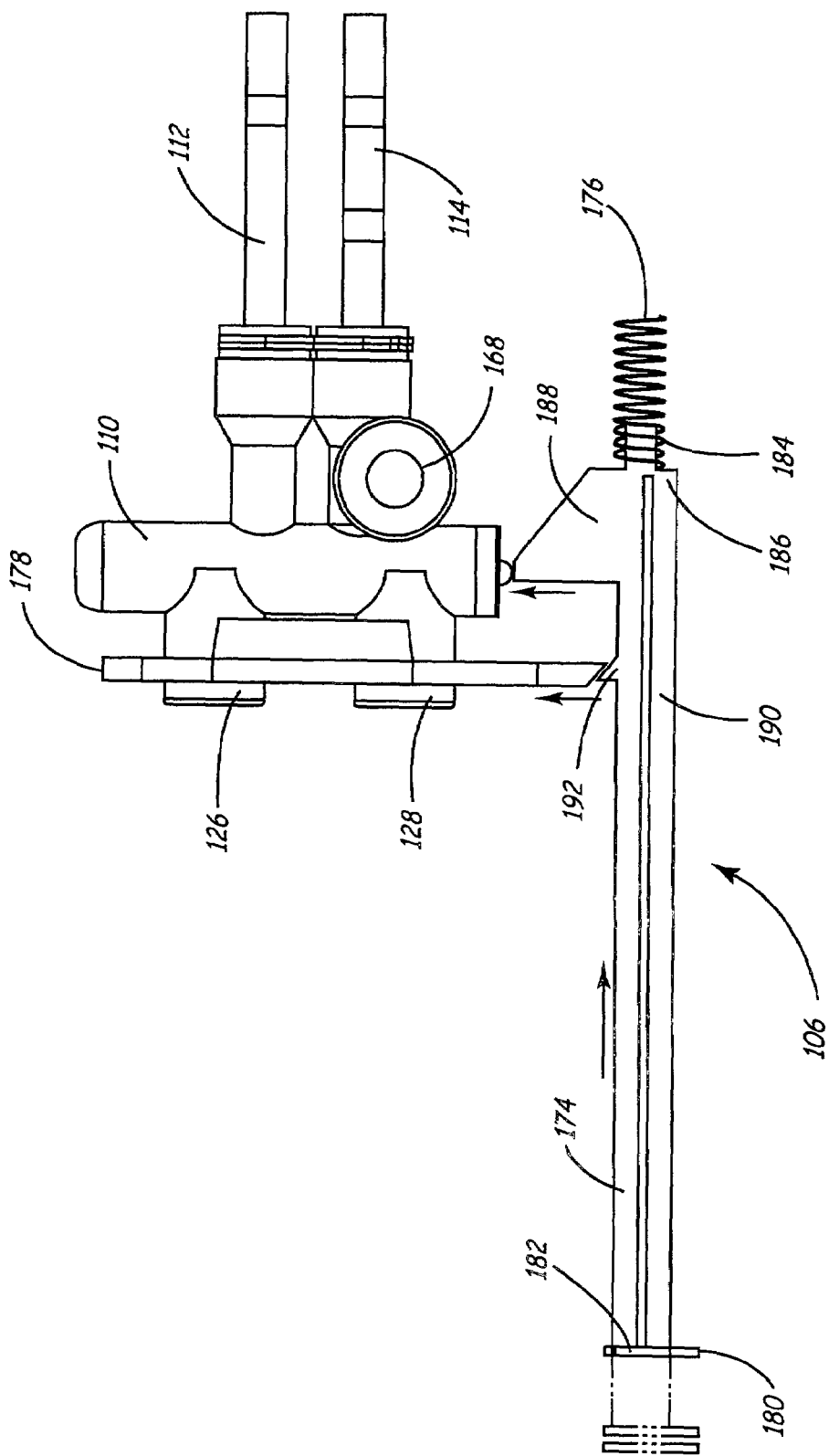
FIG. 3 is a plan view of the manifold assembly with latch assembly of FIG. 1.

Referring to FIG. 3, the latching assembly 106 is shown in cooperation with the manifold assembly 104. The latching assembly 106 comprises a latch actuator 174, a bias member 176 and a latching collar 178. The latch actuator 174 is an elongated member having a push button 180 on a first end 182 and a spring receiving feature 184 at a second end 186. A valve actuator ramp 188 extends from the actuator's longitudinal surface 190 adjacent the second end 186. A smaller cartridge release ramp 192 is formed adjacent to the valve ramp 188. The actuator 174 slides within a guide or guides (not shown) formed into or provided to the appliance to ensure that the actuator 174 operates with a linear fore and aft motion.

Figure 4:
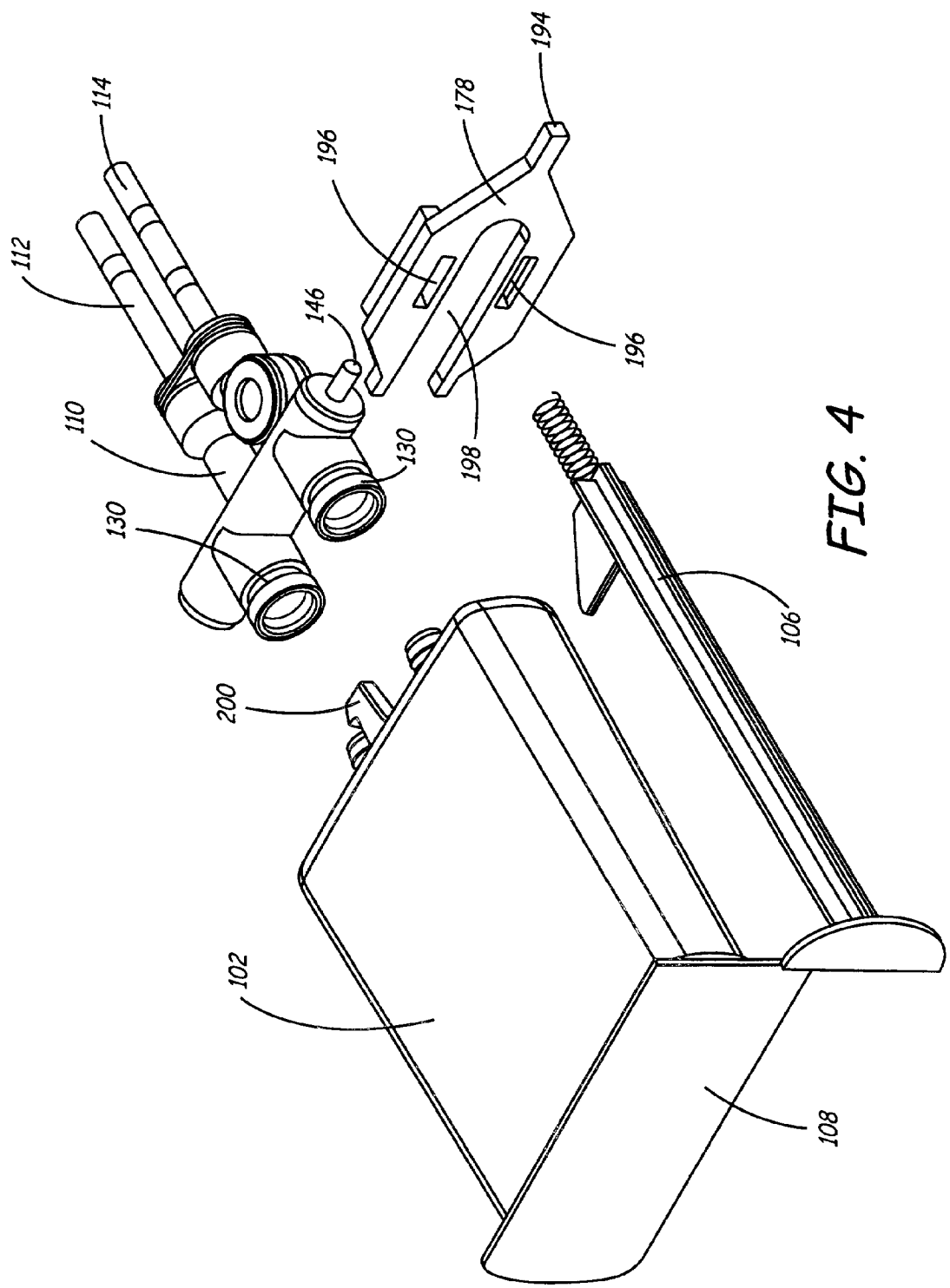
FIG. 4 is an assembly drawing of the modular filter assembly according to an embodiment of the present invention.

A latch plate or collar 178 is provided to the grooves 130 in the manifold block 110. The collar 178, as shown in FIG. 4, is a generally Y-shaped member having an actuator protrusion 194 at the base and a latching aperture 196 defined in each of the branches. The void 198 between the branches slidably engages grooves or channels 130 provided to the manifold block 110.

Figure 5:
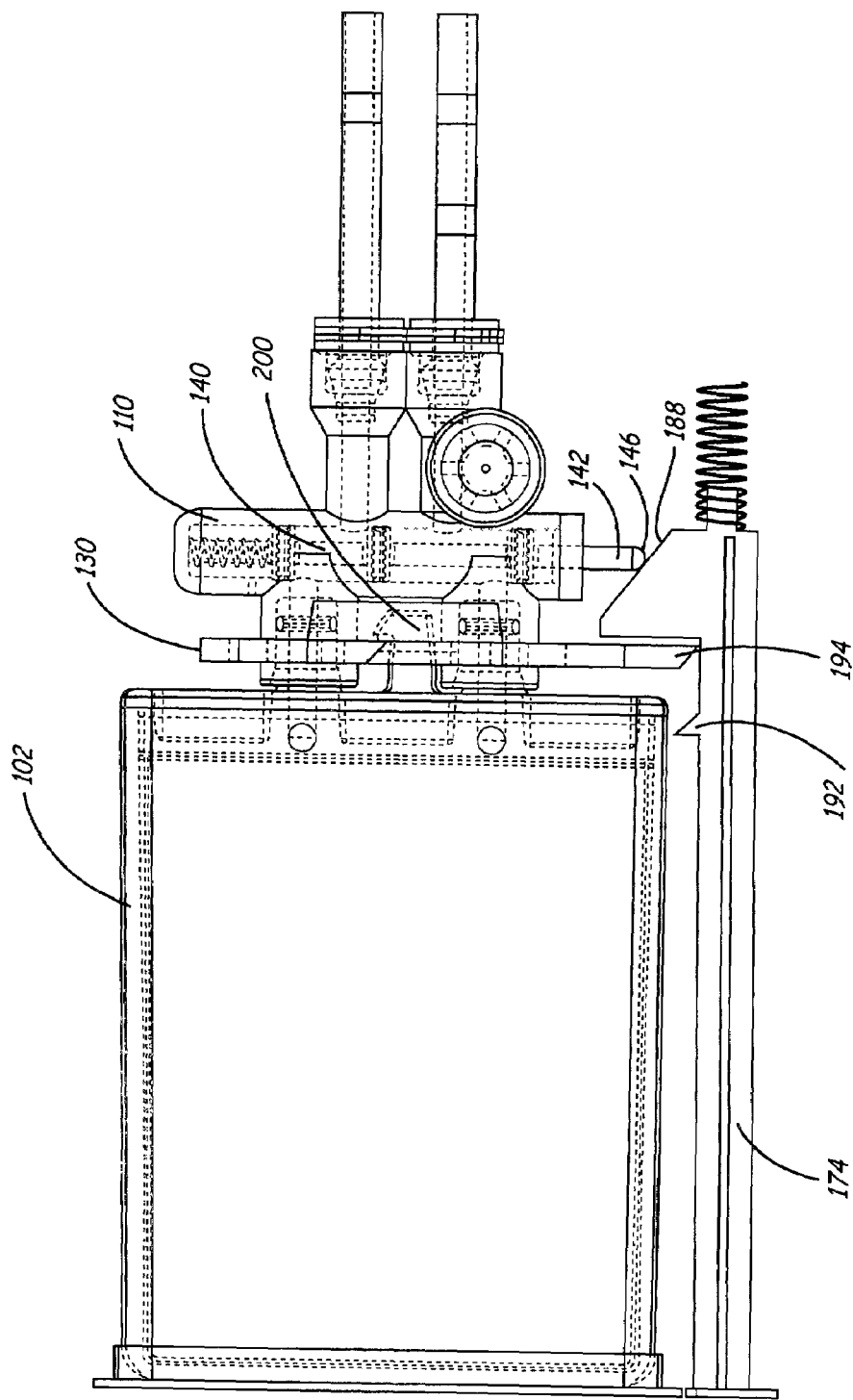
FIG. 5 is a detail view of the modular filter assembly of FIG. 1.

Referring to FIG. 4, the modular filter assembly 100 is assembled by sliding the latching collar 130 onto the manifold block 110, inserting the cartridge 102 protrusions into their respective receptacles 116, 118 in the manifold block and pushing the cartridge 102 into place until it comes to rest at the point of full engagement. As the cartridge 102 is engaged with the manifold block 110, a latching member 200 engages a latching aperture 196 in the collar 130. Said engagement ensures that the cartridge 102 will not unintentionally unlatch during use. The engagement of the cartridge 102 with the manifold assembly 104 resets the latching assembly 106, which moves the spool valve 140 into the open flow position. The fully latched filter cartridge 102 is shown in the detailed view of FIG. 5.

When a user desires to remove the filter cartridge 102 for replacement, they push on the actuator 174. The movement of the actuator 174 causes the cam end 146 of the diversion member 142 to ride up the valve actuator ramp 188, which urges the flow diversion device 140 to a closed position, closing off the water flow to the filter cartridge 102. The latch release ramp 192 of the latch actuator 174 next contacts the actuator protrusion 194. This contact causes the collar 130 to move transversely with respect to the movement of the latch actuator 174. The transverse movement of the collar 130 disengages the latching member 200 of the filter cartridge. The user may then disengage the cartridge 102 from the manifold block 110. Alternatively, a spring (not shown) may be used to eject the cartridge 102 from the manifold assembly 104 after the cartridge 102 has been unlatched.

Figure 6:
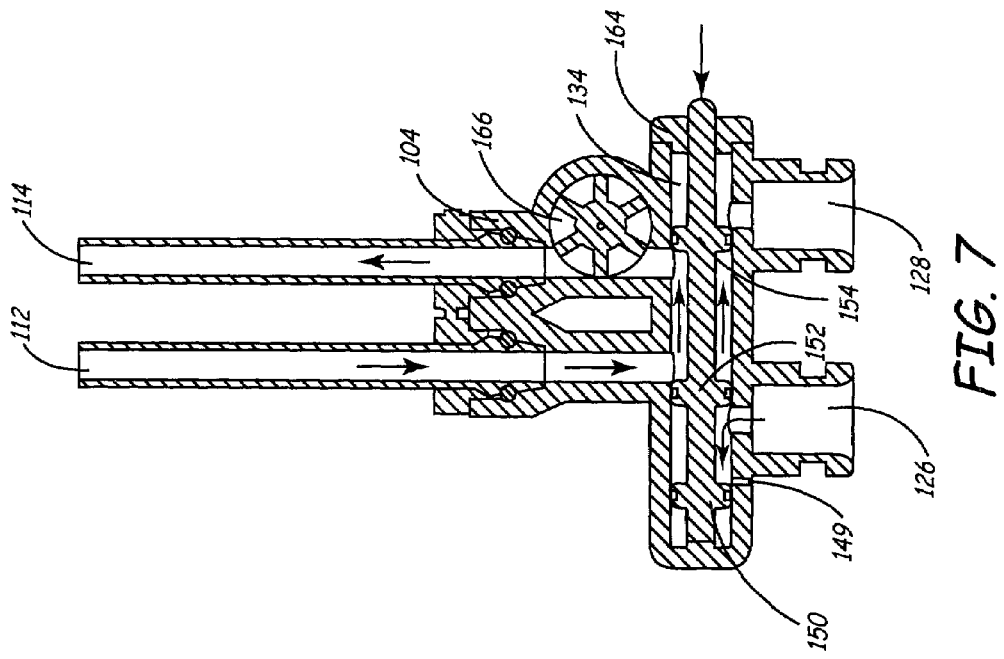
FIG. 6 is a sectional plan view of the manifold assembly of a modular filter assembly according to an embodiment of the present invention showing the flow diversion member in an open position.
Figure 7:
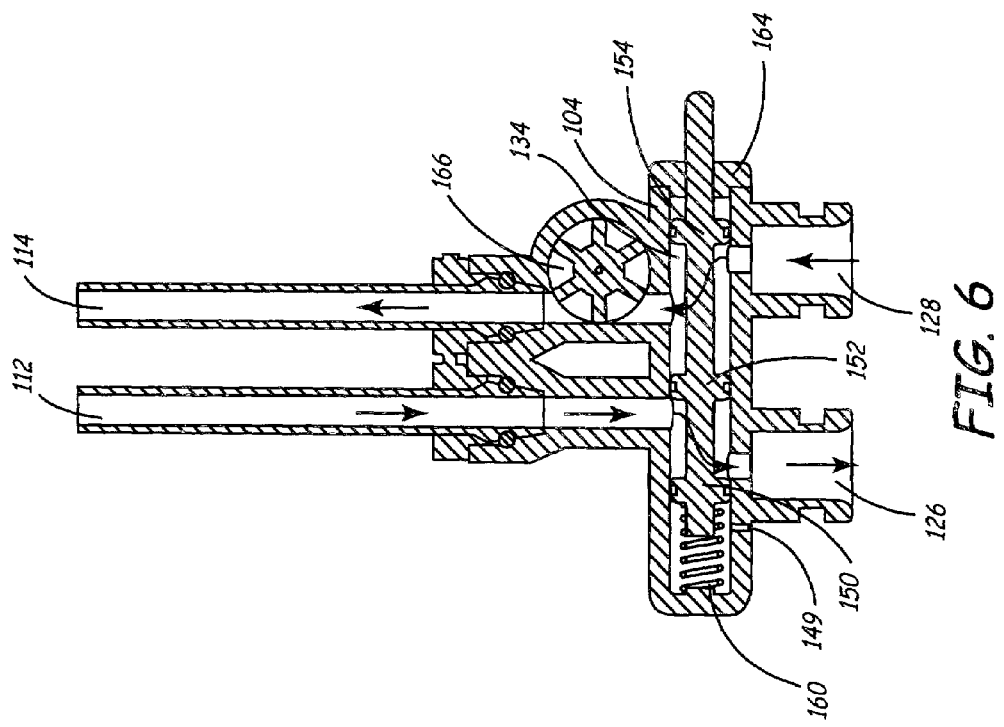
FIG. 7 is a sectional plan view of the manifold assembly of a modular filter assembly according to an embodiment of the present invention showing the flow diversion member in a closed position.

Referring to FIGS. 6 and 7, the flow of water through the manifold assembly 104 will be described. FIG. 6 illustrates a cross section of the manifold assembly 104 in the open position. Water enters from the inlet conduit 112, travels into the block 110 and enters the transverse conduit 134 between the first diverter seal 150 and the second diverter seal 152. The placement of the first 150 and second diverter seals 152 allows the incoming fluid to pass through the inlet port 126 to the filter cartridge 102. The first diverter 150 ensures that no water contacts the spring 160, which is in the extended or relaxed state. The second diverter 152 ensures that no incoming unfiltered water communicates with the outlet conduit 128.

A bleed port 149 is provided to a portion of the transverse channel 134 adjacent the inlet port 126. The bleed port 149 communicates between the transverse channel 134 and the exterior of the manifold block 110. FIGS. 6 and 7 illustrate the function of the bleed port 149. The port 149 is sealed from water flow by the position of the first diverter seal 150 in FIG. 6, corresponding to flow passing freely through the filter cartridge 102. When the spool valve 140 is in the closed position of FIG. 7, the bleed port 149 allows water and air to escape from the manifold block 110. A drain conduit (not shown) may be provided to the outlet of the bleed port 149 to capture water and air exiting the port 149. In a relatively high-pressure system, the pressure in the cartridge 102 remains under high pressure when the spool valve 140 is closed. The bleed port 149 allows relief of this high pressure, thereby eliminating the potential of forceable disengagement of the cartridge 102.

Filtered water from the filter cartridge 102 enters the manifold assembly through the outlet port 128, proceeds through the transverse channel 134, turns the flowmeter impeller 170 and exits through the outlet conduit 114 on its way to a point of use. The filtered water passes between the second 152 and third 154 diverters before entering the flowmeter housing portion 166 of the manifold block 110. The second diverter 152 ensures that no filtered water mixes with unfiltered water. The third diverter 154 ensures that no water escapes from the manifold block 110 through the cap 164 on the transverse channel 134.

FIG. 7 illustrates the manifold assembly 104 in the closed-loop position. The diversion device 140 is in the fully compressed position, which causes the second flow diverter 152 to prevent water from entering the inlet port 126. Instead, the unfiltered water flows along the member 142 until reaching the third diverter 154. Once reaching the third diverter 154, the water must travel out through the outlet conduit 114 because the outlet port 128 is blocked by the third diverter 154. This bypass system described herein allows water to flow to a point of use within the sealed circuit without leaking into the appliance even when the filter cartridge 102 is completely removed from the manifold assembly 104.

Referring to FIG. 8, a representative control diagram for an intelligent refrigerator is shown. Filtered water 201 flows from the outlet conduit 114 of the filter assembly 100 towards several possible points of use. These points of use may be a user-selectable water outlet 202 and/or an ice cube maker 204. Other point-of-use devices are contemplated by the scope of the present invention. A microprocessor 206 is electrically connected to the flowmeter 168 in the filter assembly 100 and to each of the point-of-use devices 202, 204. The microprocessor 206 senses the volume of water filtered 201 with a sensor 205 that monitors the rotation of the impeller 170 and correspondingly presents an indication 208 to the user when to change the filter cartridge 102 based upon volume of water used. The microprocessor 206 can also monitor the volume of ice in the ice cube receptacle 204 with tray sensor 207, the status of the user selectable water outlet 202, humidity sensors located at points in the refrigerator and leak detectors placed in the refrigerator for detecting water leaking from any source therein.

Referring to FIGS. 9–12, a filter cartridge 102 according to an embodiment of the present invention is shown. The filter cartridge 102 generally comprises a shell 220, a filter element 222 and a filter cap 224. The filter element 222 is disposed within the shell 220 and then the shell is sealed with the filter cap 224. The shell 220 is typically formed of plastic and manufactured by an injection molding operation. This is also the same process used to form the manifold assembly and the latching assembly. The shell 220 defines a recess 226 therein for receiving the filter element 222. The filter cap 224 includes two unitarily molded protrusions 228, 230; one corresponding to the inlet port 228 and one corresponding to the outlet port 230. The cap 224 also includes a resilient latching member 232 for securing the cartridge 102 to the manifold block 110. This latching member 232 differs from that described in reference to FIGS. 1–5, and will be discussed in greater detail below.

Figure 13:
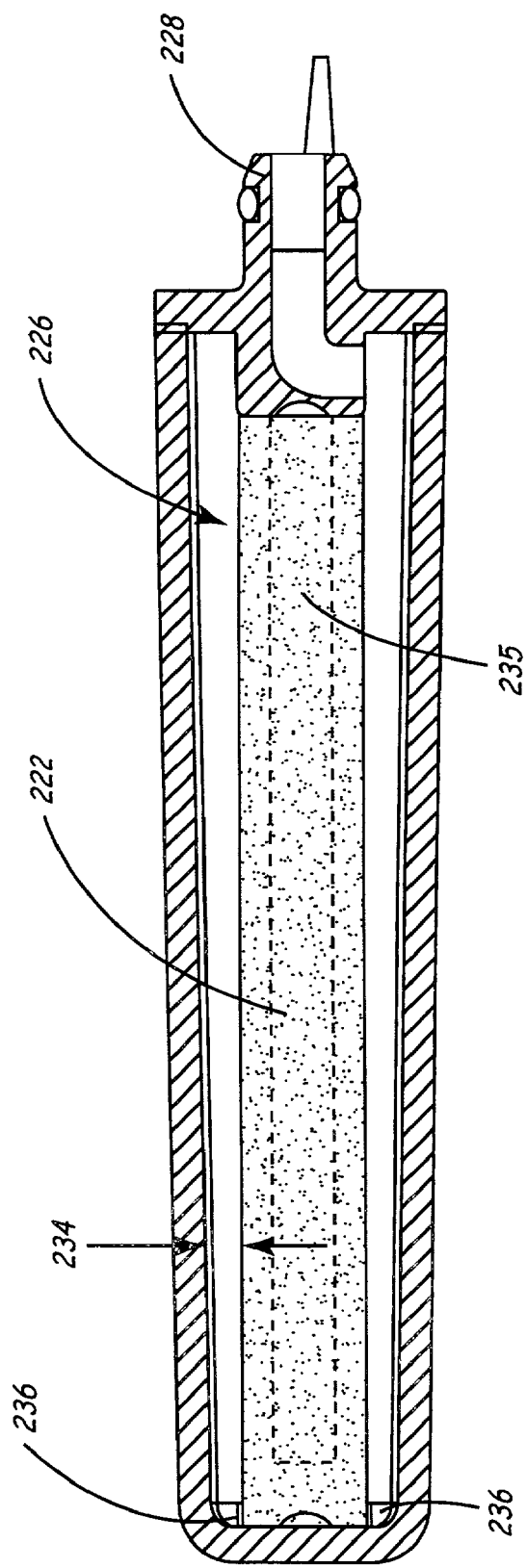
FIG. 13 is a side cross sectional view of a filter cartridge according to an embodiment of the present invention.
Figure 14:
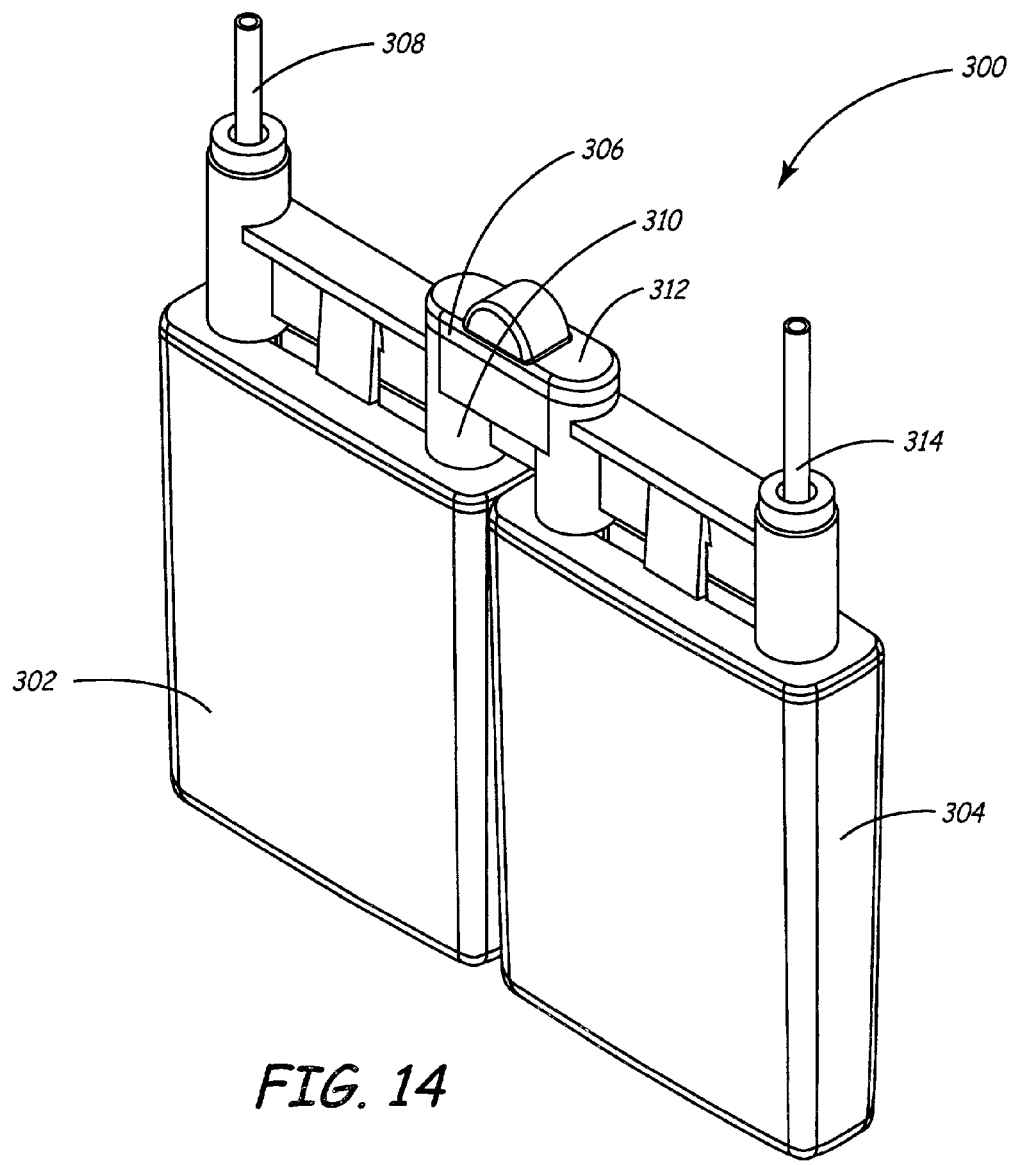
FIG. 14 is a perspective view of modular filter assembly according to an embodiment of the present invention.

Referring to the cross section side view of a filter cartridge 102 of FIG. 13, the filter element 222 consumes less volume than the volume of the recess 226 formed in the shell. The purpose of this smaller volume is apparent from an understanding of how such filtering cartridges work. The unfiltered water enters the cartridge through the water inlet protrusion 228. Then the water travels through the passage defined by the gap 234 between the shell 220 and outside of the filter element 222. The filter element 222 defines its own internal passage 235 that is in contact with the filtered water outlet protrusion 230. Thus, all water exiting from the filter cartridge 102 must pass through the filter media 222. A plurality of spacers 236 and/or stiffening ribs may be placed at various points throughout the recess 226 in the shell 220 to maintain consistent spacing and support for the filter element 222.

The filter element 222 is sealed within the shell 220 by a combination of plastic welding techniques and glue. The filter cartridge 102 must be hermetically sealed so that no water escapes therefrom and to ensure than no external contaminants enter. The cap 224 includes an internally protruding portion 238 that contacts an edge 240 of the filter element 222. This plastic-to-filter contact must be sealed with glue, such as hot melt glue or urethane, in order to provide a seal strong enough to prevent communication of the filtered and unfiltered water. The shell-to-cap interface can be sealed by plastic welding techniques such as vibration welding or ultrasonic welding. Alternatively, the cap 224 can also be glued to the shell 220. The assembled filter cartridge 102 is a low-profile design due to the rectangular prismatic filter element.

Referring to FIG. 37, an alternative embodiment for assembling the filter cartridge 102 is shown. The shell 220 comprises an upper portion 246 and a lower portion 248. The respective portions 246, 248 are joinable along a perimeter interface by vibration welding, sonic welding or glue. The cartridge 102 is assembled by placing the filter element 222 into one of the upper 246 or lower 248 portions, placing the corresponding portion thereon, aligning the interface and sealing. The cap 224 is provided to the assembled shell in the same manner as described above. Alternatively, the cap may be unitarily formed, in whole or part, with the upper 246 and/or lower 248 portions.

The filter element 222 can be any suitable structure and composition for the filtration of water. In some embodiments, the filter element 222 comprises a polymer forming a porous matrix. Water passing through the filter element passes through the pores to traverse the filter element. Example of suitable polymers include, for example, polyalkylenes, corresponding copolymers, substituted polyalkylenes and combinations thereof. Suitable polyalkylenes include, for example, polyethylenes and polypropylenes. Ultrahigh molecular weight polyethylenes for fibrils upon the application of shear such that the fibrillated polymers can form desired pores. Filtration media for water formed from ultrahigh molecular weight polyethylene is described further in U.S. Pat. No. 4,778,601 to Lopatin et al., entitled "Microporous Membranes Of Ultrahigh Molecular Weight Polyethylene," incorporated herein by reference.

In some embodiments, the filter media 222 includes fillers within the polymer matrix, which can act as a binder for the filler particles. For water filtration, activated carbon particles can be a desirable filter since the activated carbon can be effective to remove some compounds from water. Activated carbon can also be referred to as charcoal. In some embodiments, the filter element comprises from about 5 weight percent activated carbon to about 95 weight percent activated carbon. Filters formed with ultrahigh molecular weight polyethylene (generally from about 17 to about 30 weight percent) and activated carbon are described further in U.S. Pat. No. 4,753,728 to VanderBilt et al., entitled "Water Filter," incorporated herein by reference. Water filters with a majority by weight ultrahigh molecular weight polyethylene and a minority by weight activated carbon are available commercially from Polymerics, Inc. (AKA, Polymerix Filters), Longmont, Colo.

The low profile cartridge 102 allows for greater packaging efficiency when used in appliances such as refrigerators. Refrigerators cannot have substantial space devoted to bulky filter cartridges because such space decreases the available space for storage or features. Simultaneously, however, the cartridge 102 must be effective and allow for placement where the user can easily access the filter cartridge 102.

Referring to FIGS. 14–22, a dual filter cartridge embodiment of the present invention is shown. This embodiment illustrates the concept that two or more filter cartridges 302, 304 may be linked together in operable communication to filter an incoming water supply for multiple contaminants. The multiple cartridge filter assembly 300 embodiment comprises a first filter cartridge 302, a second filter cartridge 304 and a manifold assembly 306.

The unfiltered water is introduced to the first cartridge 302 through an inlet conduit 308. The water filtered by the first filter cartridge 302 exits an intermediate water outlet 310. The water exiting the intermediate water outlet 310 then passes through a flow connector portion 312 of the manifold assembly 306 and introduces the water to the second filter cartridge 304. The second filter cartridge 304 filters the once-filtered water and then passes the now twice-filtered water out to a point of use through an outlet conduit 314.

Figure 17:
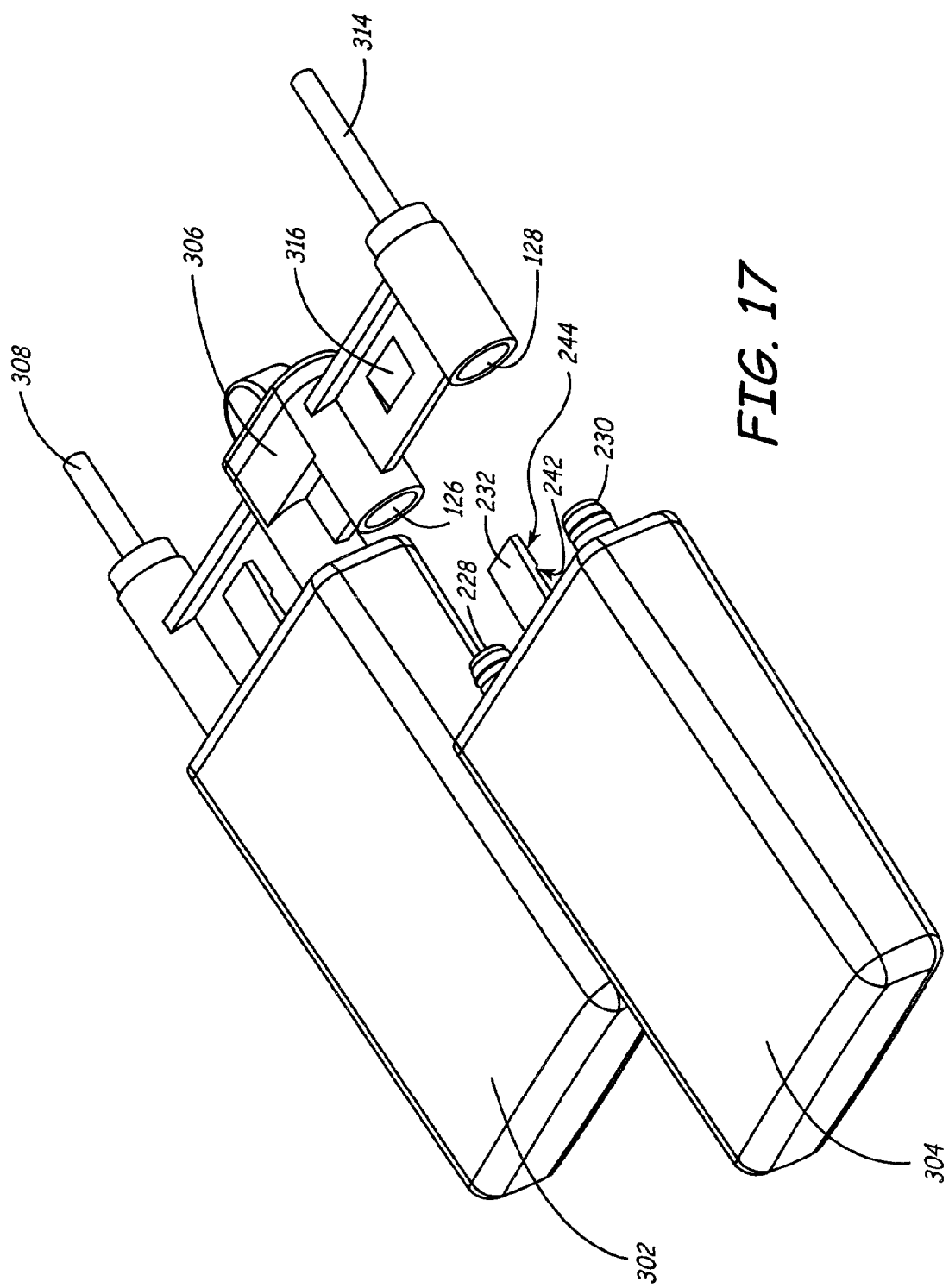
FIG. 17 is a perspective view of a modular filter assembly according to an embodiment of the present invention with one filter cartridge unlatched.
Figure 18:
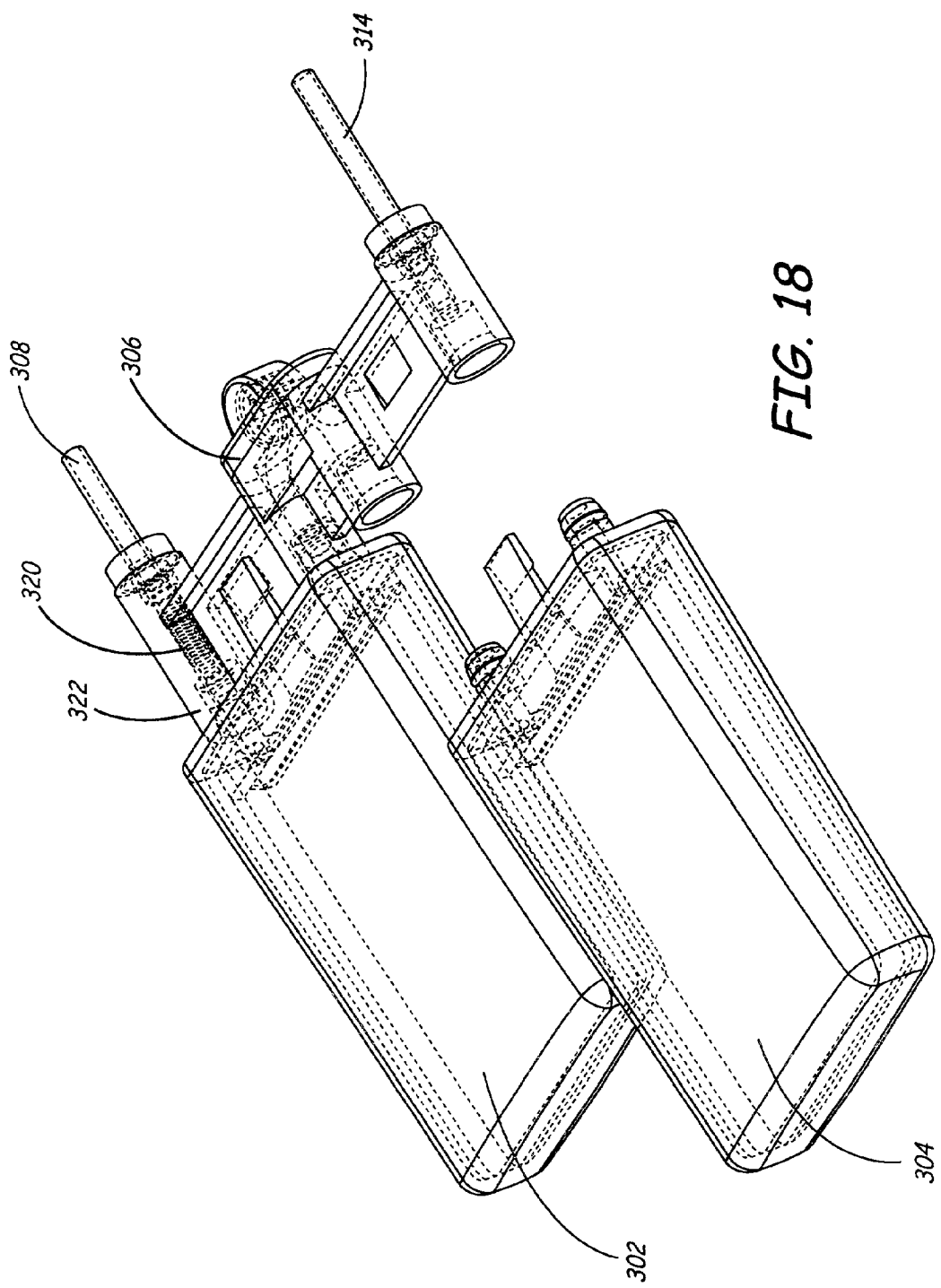
FIG. 18 is the perspective view of FIG. 17 showing hidden detail according to an embodiment of the present invention.
Figure 20:
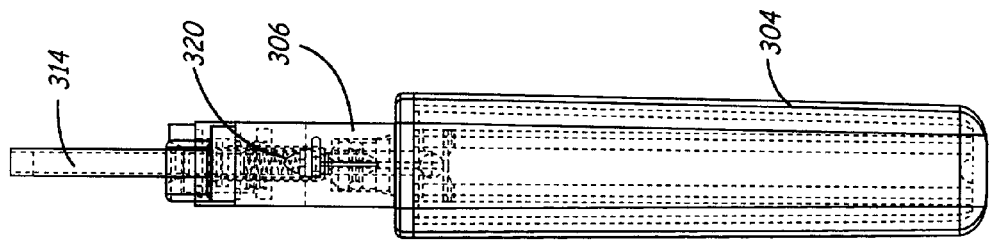
FIG. 20 is a the side view of FIG. 16 showing hidden detail according to an embodiment of the present invention.
Figure 19:
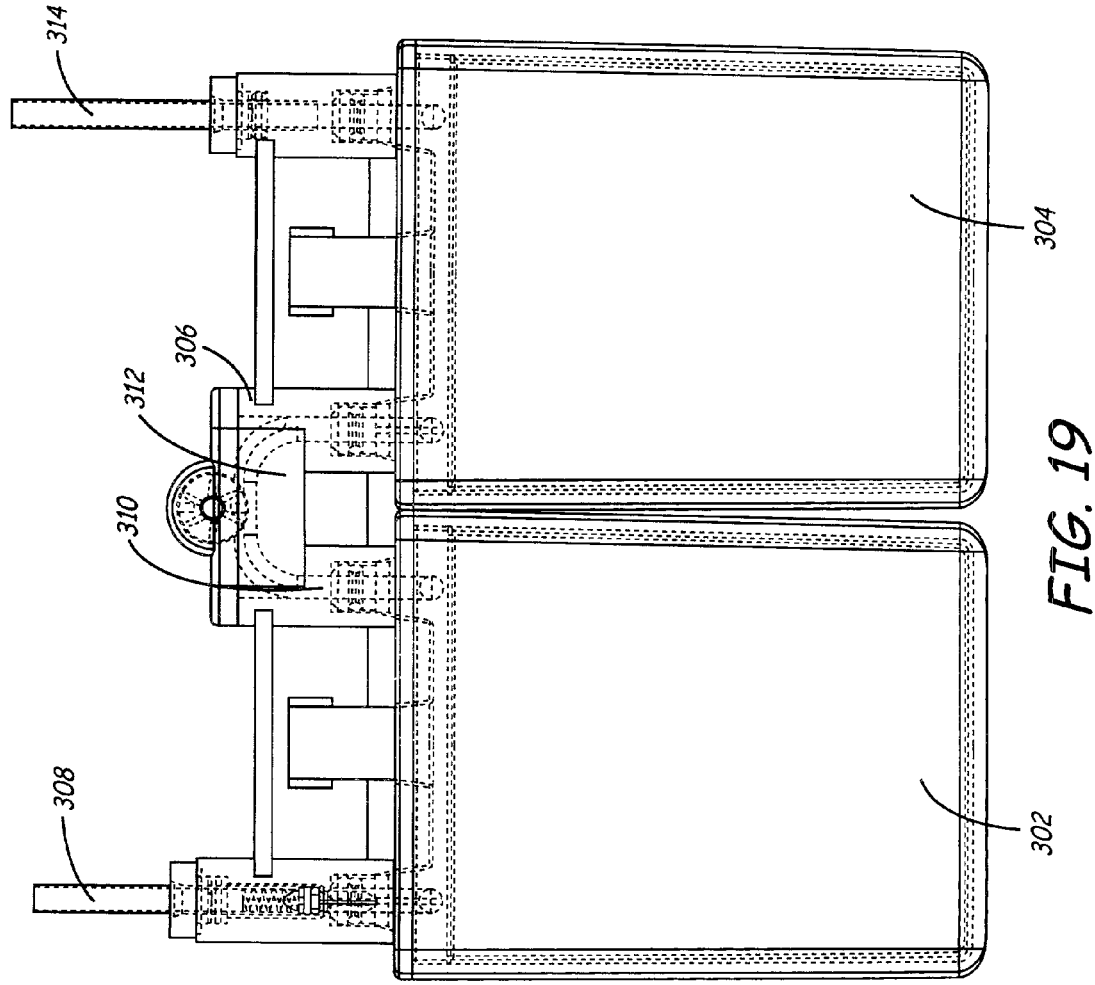
FIG. 19 is the plan view of FIG. 15 showing hidden detail according to an embodiment of the present invention.

Referring to FIG. 17, a latching mechanism for securing the cartridges to the manifold assembly is shown. The latching mechanism shown in FIG. 17 is an alternative to that shown in FIGS. 1–5 and is ideally suited for low-pressure applications. The resilient latching member 232 protrudes from the cartridge 304. A recess 316 is formed in a support portion 318 of the manifold assembly 306 between the inlet 308 and outlet 314 conduits. The latching member 232 includes an engaging surface 242 and a sloped cam surface 244. A cartridge 302, 304 is secured to the manifold assembly 306 by aligning the respective protrusions 228, 230 of the cartridge and the ports 126, 128 of the manifold. The cam surface 244 of the latching member 232 slides across the support portion 318 as the protrusions 228, 230 are inserted into the receiving ports 126, 128. The cartridge 304 is moved by the user into further engagement until the cap 224 abuts against the ports 126, 128. At the point of abutment, the engaging surface 242 of the latching member 232 engages the recess 316 in the support portion 318.

The resiliency of the latching member 232 causes the engagement surface 242 to maintain this contact until the user exerts a removal force sufficient to back the engagement surface 242 away from the recess 316. The engaging force exerted by the spring constant of the latching member 232 is greater than the force created by the pressure of the water trying to move through the inlet protrusion 228.

Referring to FIGS. 18–22, the flow control to the modular filter assembly 300 is controlled by the use of a poppet valve 320 placed in-line within the inlet portion 322 of the manifold assembly 306. The use of a poppet valve 320 simplifies the embodiment for the manifold 306 utilizing a bypass system, as described previously. The use of the in-line valve 320 precludes the ability to permit water flow to points of usage when the filter cartridge 302, 304 is not in place. This is advantageous in some instances because the passage of unfiltered water downstream of the manifold assembly 306 could contaminate the system to a degree that cleaning is needed before the water at the point of use is in acceptable condition.

Figure 31:
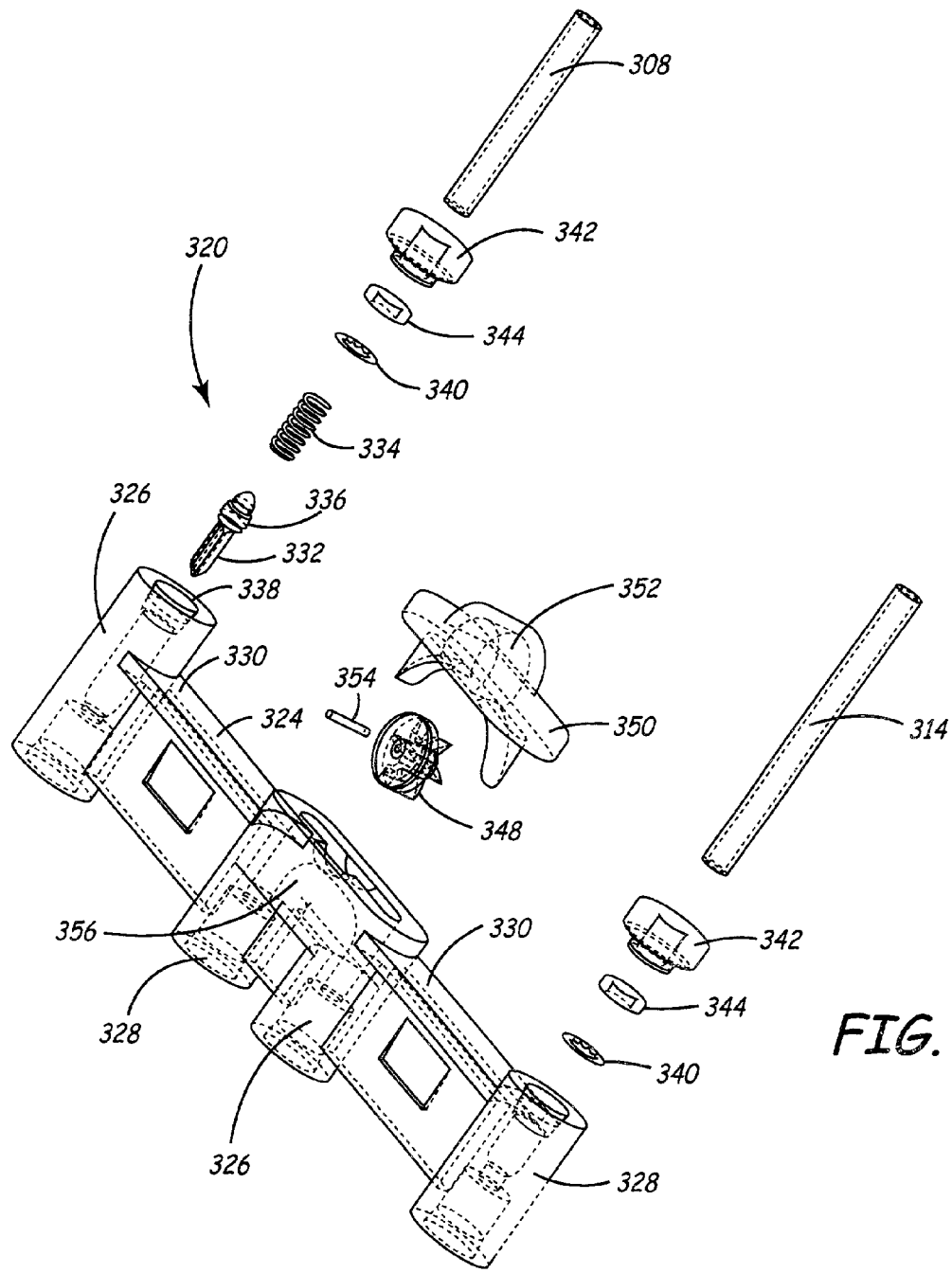
FIG. 31 is an assembly drawing of a manifold assembly for a modular filter assembly according to an embodiment of the present invention.
Figure 32:
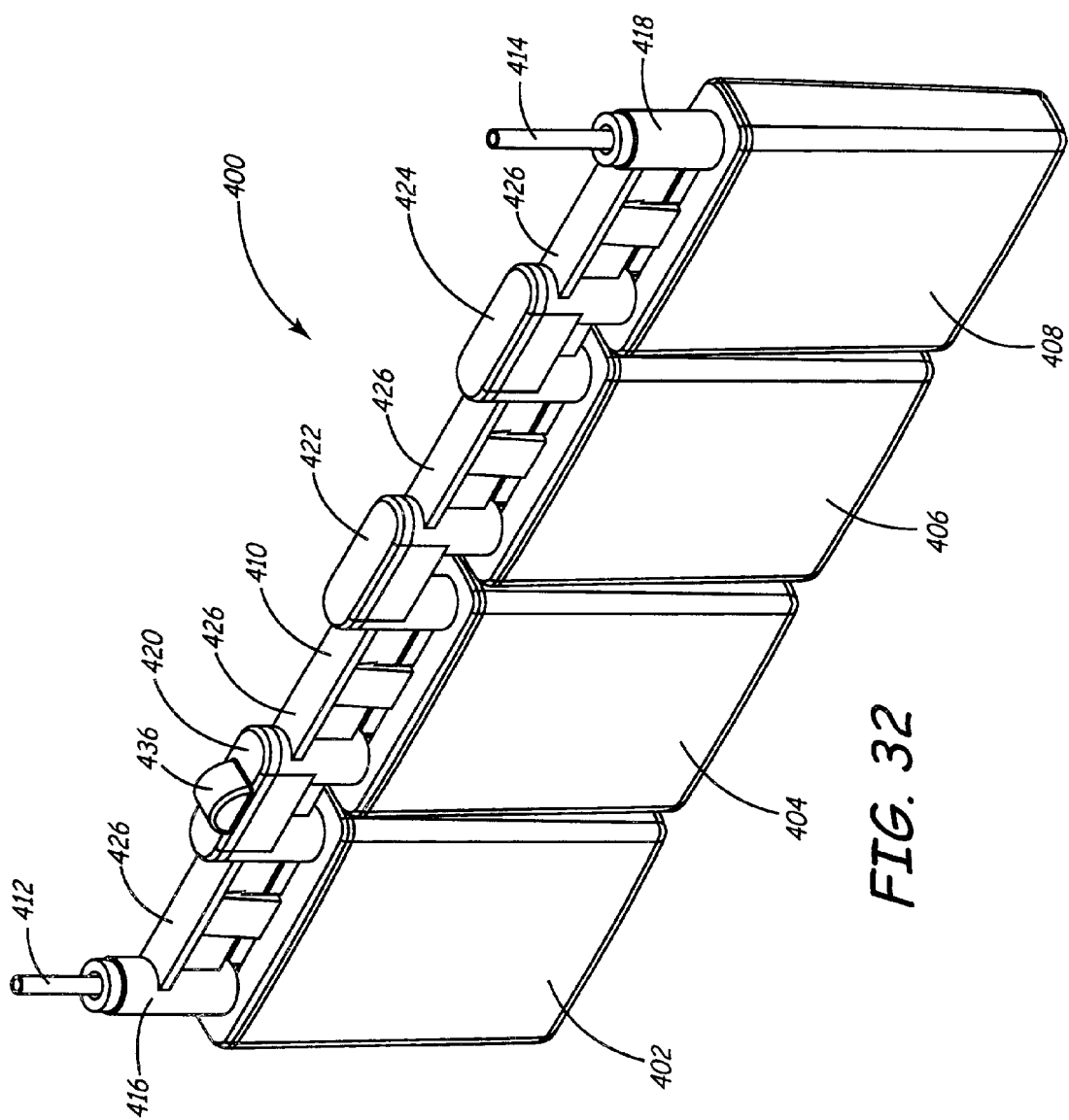
FIG. 32 is a perspective view of a modular filter assembly according to an embodiment of the present invention.

FIGS. 23–31 show various illustrations and details of the manifold assembly 306 according to am embodiment of the present invention. In particular, FIG. 31 illustrates the components and assembly of the manifold for a two-cartridge embodiment. The manifold assembly 306 comprises a manifold block 324 having an inlet portion 326, an outlet portion 328 and a connector portion 330 (previously the support portion 318) therebetween.

The components of the poppet valve 320 are shown as provided to the inlet portion 326. It should be recognized that such a valve may also be provided to each inlet portion 326 for a given cartridge to allow that cartridge to be removed and to stop water flow without also having to remove the first cartridge 302. The poppet valve 320 comprises a poppet 332, a spring 334, and a sealing gasket 336. The poppet 332 is urged into a sealing position against a valve seat 338 in the inlet portion 322 by the spring 334.

The spring 334 then contacts a tubing retainer or cap 342. A washer 340 and sealing gasket 344 are disposed within the retainer 342 to hold conduit 308, 314 firmly in place. Co-pending U.S. patent application Ser. No. 10/210,776, entitled "TUBING ATTACHMENT," filed Jul. 31, 2002 and having the same inventive entity and assignee, further discloses the features of the attachment device 342. Said Co-pending U.S. Patent Application is hereby incorporated by reference herein.

The introduction of the inlet protrusion 228 of a filter cartridge 302, 304 causes the poppet 332 to push against the spring 334, thereby providing for fluid to flow into the inlet protrusion 228. The water flows in through the inlet conduit 308, around the poppet 332, and into the inlet 228 of the first cartridge 302.

Referring to FIGS. 21 and 31, a flow sensor 346 may be provided to the manifold assembly 306. An impeller 348 type flow sensor is disposed within the flow connector portion 312. An upper portion 350 of the connector portion 312 of the manifold 324 is removable. A recess 352 for the impeller is defined in the upper portion 350. The impeller 348 is rotationally mounted about a shaft 354 within the upper portion 350. The upper portion 350 is then sealed to the lower portion 356 of the connector portion 312.

Other types of flow control devices may be used instead of, or in addition to, the two different embodiments described herein. A solenoid valve may be placed in communication with the inlet conduit 308. The solenoid valve may be controlled by the microprocessor 206, which determines if the filter cartridges 302, 304 are properly sealed in place. The microprocessor 206 can also selectively turn the water flow off if the filters 302, 304 are no longer working effectively and need to be replaced. This ensures that only properly treated water is allowed to pass downstream of the manifold assembly 306. A distribution valve may also be used in place of the solenoid valve or the other valve embodiments described herein.

Referring to FIGS. 32–35, a modular filter assembly 400 comprising a series of four filter cartridges 402, 404, 406, 408 is depicted as an embodiment of the present invention. The four cartridge embodiment comprises a first filter cartridge 402, a second filter cartridge 404, a third filter cartridge 406, a fourth filter cartridge 408, a manifold assembly 410, an inlet conduit 412 and an outlet conduit 414. The manifold assembly 410 comprises an inlet portion 416, an outlet portion 418, a first connector portion 420, a second connector portion 422 and a third connector portion 424. Each of the above portions 416, 418, 420, 422, 424 is joined and supported by a support potion 426 between adjacent portions. A flowmeter 436 may be provided to one or more of the portions 420, 422, 424.

Each of the four cartridges 402, 404, 406, 408 is arranged in a series wherein the outlet of one cartridge supplies water to the inlet of an adjacent cartridge until the last cartridge 408 is reached. The last cartridge 408 communicates with the outlet conduit 414, which supplies filtered water to points of use in the system. The present invention contemplates one or more filter cartridges and is not limited to only one, two or four as described herein. The present invention can be scaled up to more cartridges or scaled to fewer cartridges in order to suit the needs of particular users.

Cartridge blanks 428 may be provided to a manifold 410 to allow a filtering system designed for multiple cartridges to be operated with less than the maximum number of cartridges. For example, an appliance designed to receive three filter cartridges for filtering three different types of contaminants from water may not need all three filters under certain circumstances. The filtering system cannot operate with one of the filters removed because there is no path to communicate the water to an adjacent cartridge or the outlet conduit. Therefore, a filter blank 428 may be used. The blank, as shown in FIG. 36, is a segment of plastic tubing 430 having an inlet side 432, an outlet side 434 and a latching member 438. Each of the sides 432, 434 is configured to communicate water between a given inlet portion and outlet portion of a manifold assembly 410.

Figure 39:
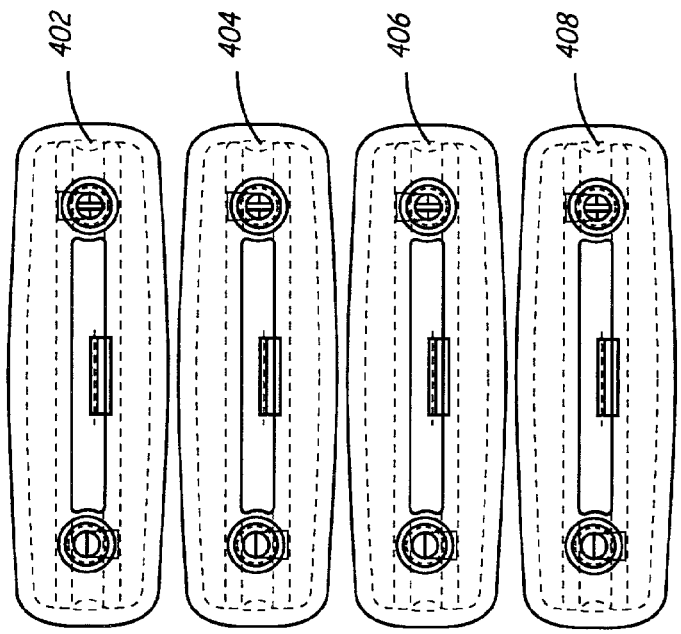
FIG. 39 is a rear view of a modular filter assembly according to an embodiment of the present invention.
Figure 38:
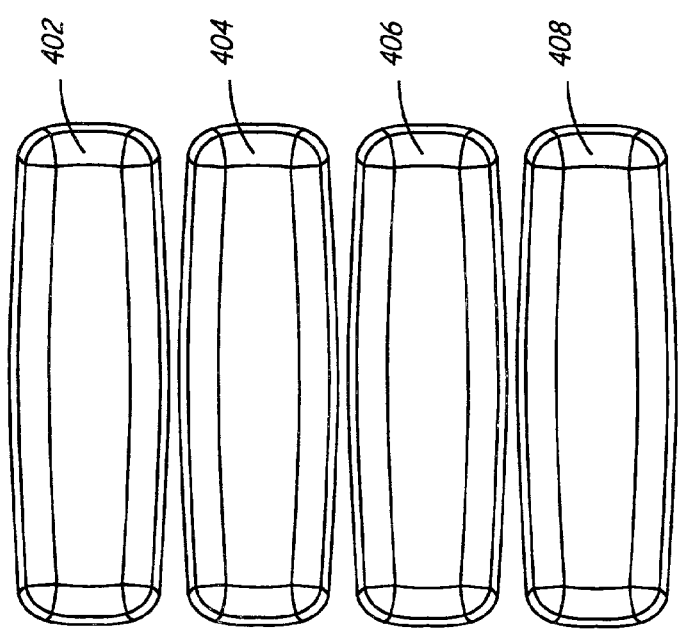
FIG. 38 is a front view of a modular filter assembly according to an embodiment of the present invention.

Referring to FIGS. 38–39, an alternative embodiment of the multiple cartridge layout is depicted. Each of the four filter cartridges 402, 404, 406, 408 is stacked vertically, rather than side-by-side as in FIGS. 32–35.

A vertical manifold 440 for use with the vertical stack configuration is illustrated in FIG. 40. The manifold 440 comprises a plurality of inlet portions 416 and outlet portions 418 corresponding to each of the first 402, second 404, third 406 and fourth 408 filter cartridges. A first connector portion 420 operably connects the first 402 and second 404 cartridges. A second connector portion 422 operably connects the second 404 and third 406 cartridges. A third connector portion 424 operably connects the third 406 and fourth 408 filter cartridges. A flow meter 436 may be provided to one or more of the connection portions 420, 422, 424 for monitoring the volume of water flowing through the cartridges 402, 404, 406, 408. Support structure 442 interconnects the various components of manifold 440 for support.

FIG. 40 illustrates the ability to provide a registration means for the cartridges within the manifold. The registration is accomplished by differing the size or shape of one of the inlet 416 or outlet 418 portions of the manifold 440 and the corresponding inlet 228 or outlet 230 protrusion of the cartridge 102. FIG. 40 illustrates a square-shaped inlet portion 444, a oversized inlet portion 446 and a square-shaped outlet portion 448. It should be recognized that the size, shape and choice of inlet/outlet size for the altered features is not limited to the combinations or manifold configuration shown in FIG. 40. Any circular, eccentric or polygonal shape that differs from its corresponding inlet/outlet side is contemplated by the present invention. This method of providing registration ensures that the user cannot place a filter cartridge 102 into the manifold 440 backwards.

Figure 41:
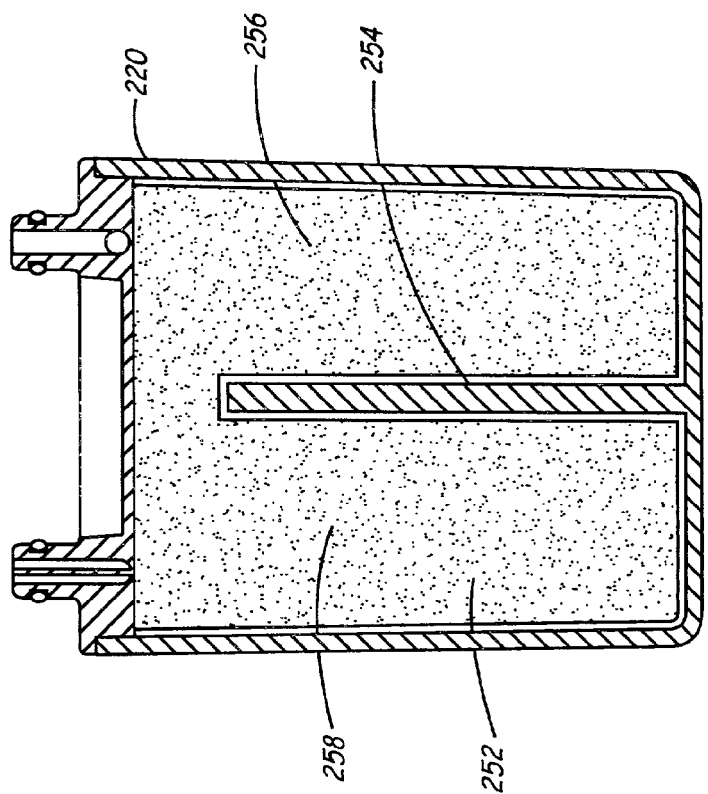
FIG. 41 is a cross sectional view of a filter cartridge according to an embodiment of the present invention.

Referring to FIG. 41, an alternative embodiment of the filter cartridge 102 is shown. A generally U-shaped or lung shaped filter element 252 is disposed within the shell 220. A septum 254 divides the right half 256 from the left half 258 of the element 252. The septum 254 provides added strength to the filter cartridge 102 for use in high-pressure applications.

Figure 42:
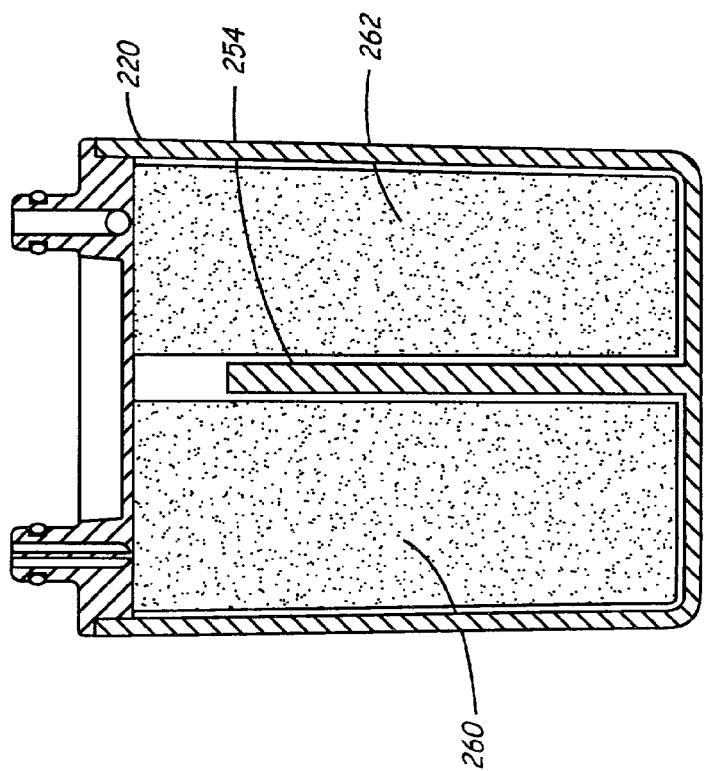
FIG. 42 is a cross sectional view of a filter cartridge according to an embodiment of the present invention.

Referring to FIG. 42, another alternative embodiment of the filter cartridge 102 is shown. A first filter element 260 and a second filter element 262 are disposed within the shell 220. A septum 254 divides the elements 260, 262 and ads strength to the cartridge 102, which may be needed to maintain the integrity of the cartridge 102 in high-pressure applications.

Although the present invention has been described with reference to preferred embodiments, workers skilled in the art will recognize changes may be made in form and detail without departing from the spirit and scope of the invention.

What is claimed is:

1. A modular water filter assembly in combination with an appliance, the modular water filter assembly comprising:
    a manifold assembly having a flow control valve operatively disposed therein, the manifold assembly being operatively disposed within the appliance and in operable communication with a water inlet conduit and a water outlet conduit;
    a bank of filter cartridges having a plurality of serial, individually replaceable cartridges, the bank of filter cartridges adjoining the manifold assembly and in operable communication therewith, the filter cartridges having inlet and outlet protrusions; and
    a linearly actuated latching assembly to operably secure the filter cartridges to the manifold assembly, the latching including (i) a resilient latching member disposed at least one filter cartridge and separate from the inlet and outlet protrusions, and (ii) a linearly moveable actuator.

2. The combination of claim 1, wherein each comprises a low-profile, generally rectangular shell and a generally rectangular filter element disposed within the shell.

3. The combination of claim 1, wherein the linearly actuated latching assembly further includes a corresponding latching recess disposed on the manifold assembly, and wherein the latching member is configured to releasably engage the latching recess.

4. The combination of claim 1, wherein the appliance is a refrigerator.

5. The combination of claim 1, wherein the manifold assembly includes a flow meter housing assembly for receiving an impeller.

6. The combination of claim 5, wherein the appliance senses water volume flowing through the filter cartridges by sensing the rotations of the impeller.

7. The combination of claim 6, wherein the appliance triggers an indicator light for a user that indicates a need to replace the filter cartridges based upon a predetermined maximum volume of water having flowed through the filter cartridge.

8. The modular filter assembly of claim 1 including a cartridge blank, the cartridge blank for replacing a cartridge and for conveying water therethrough between adjacent filter cartridges.

9. The modular filter assembly of claim 8, the cartridge blank having a water inlet, a water outlet, and a flow path in communication with the inlet and the outlet.

10. The modular filter assembly of claim 1 wherein each cartridge of the plurality of cartridges is adapted to filter/purify a certain contaminant, the certain contaminant being different from the contaminants for which the remainder of the plurality of cartridges adapted to filter/purify.

11. A modular water filter assembly in combination with a water dispensing device, the modular water filter assembly comprising:
    a manifold assembly operatively disposed within an appliance and in operable communication with a water inlet conduit and a water outlet conduit, the manifold assembly including a flow meter housing portion in fluidic communication with the outlet conduit;
    a bank of filter cartridges having a plurality of serial, individually replaceable cartridges, the bank of filter cartridges adjoining the manifold assembly and in operable communication therewith, the filter cartridges having inlet and outlet protrusions; and
    a linearly actuated latching assembly to operably secure the filter cartridges to the manifold assembly, the latching assembly including (i) a resilient latching member disposed on at least one filter cartridge and separate from the inlet and outlet protrusions, and (ii) a linearly moveable actuator.

12. The combination of claim 11, wherein the manifold assembly further comprises a flow control valve in communication with the water inlet conduit.

13. The combination of claim 11, wherein each comprises a low-profile, generally rectangular shell and a generally rectangular filter element disposed within the shell.

14. The combination of claim 11, wherein the linearly actuated latching assembly further includes a corresponding latching recess disposed on the manifold assembly, and wherein the latching member is configured to releasably engage the latching recess.

15. The combination of claim 11, wherein the appliance is a refrigerator.

16. The combination of claim 11, wherein the flow meter housing portion is provided with an impeller.

17. The combination of claim 16, wherein the appliance senses water volume flowing through the filter cartridges by sensing the rotations of the impeller.

18. The combination of claim 17, wherein the appliance triggers an indicator light for a user that indicates a need to replace the filter cartridges based upon a predetermined maximum volume of water having flowed through the filter cartridge.

19. A modular water filter assembly in combination with an appliance, the modular water filter assembly comprising:
    manifold assembly having a flow control valve operatively disposed therein, the manifold assembly being operatively disposed within the appliance and in operable communication with a water inlet conduit and a water outlet conduit;
    a filter cartridge adjoining the manifold assembly and in operable communication therewith, the filter cartridge having inlet and outlet protrusions; and
    a linearly actuated latching assembly to operably secure the filter cartridge to the manifold assembly, the latching assembly including (i) a resilient latching member disposed on the filter cartridge and separate from the inlet and outlet protrusions, and (ii) a linearly moveable actuator.

20. The combination of claim 19, wherein, the appliance comprises a refrigerator.

21. The combination of claim 19, wherein, the filter cartridge comprises a low-profile, generally rectangular shell and a generally rectangular filter element disposed within the shell.

* * * * *

UNITED STATES PATENT AND TRADEMARK OFFICE
CERTIFICATE OF CORRECTION

PATENT NO. : 7,067,054 B2
APPLICATION NO. : 10/210890
DATED : June 27, 2006
INVENTOR(S) : Karl Fritze It is certified that error appears in the above-identified patent and that said Letters Patent is hereby corrected as shown below:

<u>Title page,</u>
Item (57), ABSTRACT, Line 5, delete "inlet of appliance" and insert in place thereof -- inlet of the appliance --.

<u>Column 11,</u>
Lines 30-31, delete "latching including" and insert in place thereof -- latching assembly including --.
Line 31, delete "disposed at" and insert in place thereof -- disposed on at --.
Line 67, delete "cartridges adapted" and insert in place thereof -- cartridges are adapted --.

Signed and Sealed this

Twenty-seventh Day of March, 2007

JON W. DUDAS
*Director of the United States Patent and Trademark Office*